United States Patent
Takenoshita et al.

(10) Patent No.: US 6,962,383 B2
(45) Date of Patent: Nov. 8, 2005

(54) VEHICLE SEAT

(75) Inventors: Tadashi Takenoshita, Kagoshima (JP); Yoshirou Suehiro, Kagoshima (JP); Tomoyuki Kuroda, Aichi (JP); Teiji Naruse, Aichi (JP); Takashi Suzuki, Aichi (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/112,864

(22) Filed: Apr. 22, 2005

(65) Prior Publication Data
US 2005/0218686 A1 Oct. 6, 2005

Related U.S. Application Data

(63) Continuation of application No. 10/468,240, filed as application No. PCT/JP01/08863 on Oct. 9, 2001, now abandoned.

(30) Foreign Application Priority Data

Feb. 20, 2001 (JP) .............................. 2001-044065

(51) Int. Cl.[7] .............................. B60N 2/06; B60N 2/14; B60N 2/16; A61G 3/02
(52) U.S. Cl. .............................. 296/65.03; 296/65.04; 296/65.12; 296/65.07; 414/921; 297/344.24
(58) Field of Search .......................... 296/65.03–65.08, 296/65.11–65.12; 297/344.24; 414/921

(56) References Cited

U.S. PATENT DOCUMENTS

| 4,155,587 A | 5/1979 | Mitchell |
| 6,315,352 B1 | 11/2001 | Nomura |
| 6,328,374 B1 | 12/2001 | Patel |
| 6,457,765 B1 | 10/2002 | Berquist et al. |
| 6,543,848 B1 * | 4/2003 | Suga et al. ............ 297/344.24 |

FOREIGN PATENT DOCUMENTS

| GB | 2069969 A | 9/1981 |
| JP | 60-92752 | 5/1985 |
| JP | 9-183325 A | 7/1997 |
| JP | 10 315825 A | 12/1998 |
| JP | 11 208331 A | 8/1999 |
| WO | WO99/11488 | 3/1999 |

* cited by examiner

Primary Examiner—Dennis H. Pedder
(74) Attorney, Agent, or Firm—Patterson, Thuente, Skaar & Christensen, PA

(57) ABSTRACT

A vehicle seat 1 includes a seat unit, a lift-up unit and a long-sliding unit. The lift-up unit moves the seat unit between an interior and an exterior of a vehicle via a door opening portion that corresponds to a passenger seat position. The long-sliding unit moves the seat unit between a driver's seat position and the fellow passenger seat position. The lift-up unit moves the seat unit downward when the seat unit is positioned at the driver's seat position, so that the seat unit is located at a suitable position for driving.

23 Claims, 16 Drawing Sheets

VEHICLE SEAT

RELATED APPLICATIONS

This application is a continuation of U.S. application Ser. No. 10/468,240 filed Mar. 3, 2004, now abandoned, which is a 371 of PCT Application No. PCT/JP01/08863 filed Oct. 9, 2001, which claims priority to Japan Application No. 2001-044065 filed Feb. 20, 2001, each hereby incorporated by reference.

TECHNICAL FIELD OF THE INVENTION

This invention relates to a vehicle seat. More particularly, this invention relates to a vehicle seat that enables an elderly person, a physically handicapped person or other such persons to easily get into and out of the vehicle.

BACKGROUND OF THE INVENTION

A known vehicle seat for a welfare vehicle is disclosed in JP 11-309175 A. This vehicle seat has a seat unit and a lift-up unit. The seat unit has a seat main body and foldable front and rear wheels. The lift-up unit is installed in the interior of a vehicle cabin and capable of moving the seat unit between the interior and the exterior of the vehicle cabin, with the seat main body kept in a seating posture. When the seat unit is moved into the vehicle cabin by means of this lift-up unit, the seat unit can be used as a vehicle cabin interior seat. Further, when the seat unit is moved to the exterior of the vehicle cabin by means of the lift-up unit, and then detached from the lift-up unit, the seat unit can be used as a wheelchair.

According to this vehicle seat, a seating person can get in and out of the vehicle while seating on the seat main body of the seat unit. Thus, the seating person need not get into the wheelchair from the vehicle seat or vice versa. As a result, burden on the seating person and a helper can be remarkably reduced. Further, the movement of the seat unit between the interior and the exterior of the vehicle cabin is performed by means of the lift-up unit. This may also remarkably reduce the burden on the helper.

Further, in this vehicle seat, the front and rear wheels of the seat unit can be folded along the lower surface of the seat main body. As a result, the height of the seat unit can be reduced when the seat unit is placed inside the vehicle cabin, thereby enabling the seating person to seat substantially at the same level as the other passengers inside the vehicle cabin.

However, this type of conventional vehicle seat is rather difficult to use for a driver's seat. Therefore, such a vehicle seat is restrictively applied to an assistant driver's seat and a rear seat (i.e., the seats other than the driver's seat). One of the reasons for this is that if this type of vehicle seat is applied to the driver's seat, the vehicle seat may interfere with the steering wheel when the seat unit moves between the interior and the exterior of the vehicle cabin.

DISCLOSURE OF THE INVENTION

It is an object of the present invention to teach a vehicle seat in which a user can easily get in and out of the driver's seat inside a vehicle cabin.

In the present invention, a seat is moved between a passenger seat position (a position where a seat other than the driver's seat is arranged, that is, an assistant driver's seat position or rear seat positions) and a driver's seat position by means of a long-sliding unit and is taken up and down via a door opening portion at the passenger seat position. Thus, no obstruction such as the steering wheel S is involved unlike the case in which the seat is moved at the driver's seat position. Therefore, a driver can move smoothly from the driver's seat position to the exterior of the vehicle or vice versa.

For example, when the driver moves from the driver's seat position to the exterior of the vehicle (when the driver gets out of the vehicle), the seat is first moved to the passenger seat position by the long-sliding unit. Thereafter, the seat is rotated by a seat rotating unit from a position where it faces the front side of the vehicle to a position where it faces the door opening portion. To the contrary, when the driver move from the exterior of the vehicle to the driver's seat position (when the driver gets in the vehicle), the driver is seated on a seat unit that faces the door opening portion, and the seat unit is rotated to the position where it faces the front side of the vehicle. Thereafter, the seat unit is moved from the passenger seat position to the driver's seat position by means of the long-sliding unit.

The passenger seat position that permits moving the seat between the interior and the exterior of the vehicle may be the assistant driver's seat position, the rear seat positions in a second row behind the driver's seat and a back door position. When the seat is moved at the rear position behind the driver's seat, it is preferable to use a longitudinal long-sliding unit. When the seat is moved at the assistant driver's seat position, it is preferable to use a lateral long-siding unit. When the seat is moved at the rear seat position behind the assistant driver's seat, it is preferably to use a combination of the lateral long-sliding unit and the longitudinal long-sliding unit. When the seat is moved at the rear seat position behind the assistant driver's seat, it is possible to use an oblique long-sliding unit. When the seat is moved by utilizing the oblique long-sliding unit, it is preferable to move the rear seat behind the driver's seat and the assistant driver's seat to retracted positions, thereby avoiding interference.

So that the driver's seat can be easily moved, it is necessary to rotate the seat such that the seat faces the front side of the vehicle when it is inside the vehicle and such that the seat faces the door opening portion when it is outside the vehicle. The rotating angle of the seat is preferably approximately 90 degrees at the position of the door opening portion in the side portion of the vehicle, and is preferably approximately 180 degrees at the back door position in the rear portion of the vehicle.

Further, at the passenger seat position when the seat is moved between the interior and the exterior of the vehicle, it is necessary not only to rotate the seat but also to move it. In such a case, when the width of the door opening portion is small, the seat or the like can contact the peripheral edge or the like of the door opening portion. Therefore, it is preferable to provide a short-slide unit that permits moving the seat in the longitudinal direction of the vehicle, so that the rotating unit and the short-slide unit can be synchronously operated. For example, when the seat is rotated from the position where it faces the front side of the vehicle to the position where it faces the door opening portion, the seat is moved toward the front side of the vehicle while being rotated, and when the seat is rotated from the position where it faces the door opening portion to the position where it faces the front side of the vehicle, the seat is moved toward the rear side of the vehicle while being rotated. The synchronization region preferably corresponds to a rotation region between a position in which the seat is rotated from a position where the seat faces the front side of the vehicle toward the door opening portion by a predetermined angle and a position where the seat faces the door opening portion.

Next, for example, when the seat is moved via the door opening portion, the seat at the passenger seat position may have a height greater than that of the other seats in order to prevent the seat or the like from contacting the lower edge or the like of the door opening portion. If the seat with such a greater height is moved to the driver's seat, the person seated thereon (i.e., the driver) will be positioned at a high level (i.e., will have a high hip point). Therefore, it is preferable to provide a seat position adjusting unit that can adjust the height of the seat (hip point) at the driver's seat position.

When the seat is moved from the interior of the vehicle to the exterior of the vehicle, it is preferable that in the exterior of the vehicle, the height of the seat is set at a level as close to the ground as possible when in the exterior, so that the person seated thereon (the driver) may easily get in and out of the vehicle. Therefore, it is preferable that a seat moving device that has a four-bar linkage mechanism, a slide mechanism or other such mechanism is used as a seat moving device for moving the seat between the interior and the exterior of the vehicle. By using such a seat moving device, it is possible to reduce the height of the seat outside the vehicle by simply moving the seat from the interior of the vehicle to the exterior of the vehicle.

Because such a seat moving device permits adjusting the seat height, it can be used as the seat position adjusting mechanism. In such a case, it is not necessary to separately provide a seat position adjusting device.

Further, it is preferable to use a connecting device that can separably connect the seat and the seat rotating device. In this case, by providing the seat with wheels, the seat can be used as a wheelchair when it is separated from the rotating device outside the vehicle. Further, because the person seated on the seat can move between the interior and the exterior of the vehicle while remaining seated thereon, it is easy for the seated person to move.

The objects, features, and advantages of the present invention will be better understood after reading the following detailed description or claims together with the accompanying drawings and the claims.

PREFERRED EMBODIMENTS OF THE INVENTION

Figure 1:
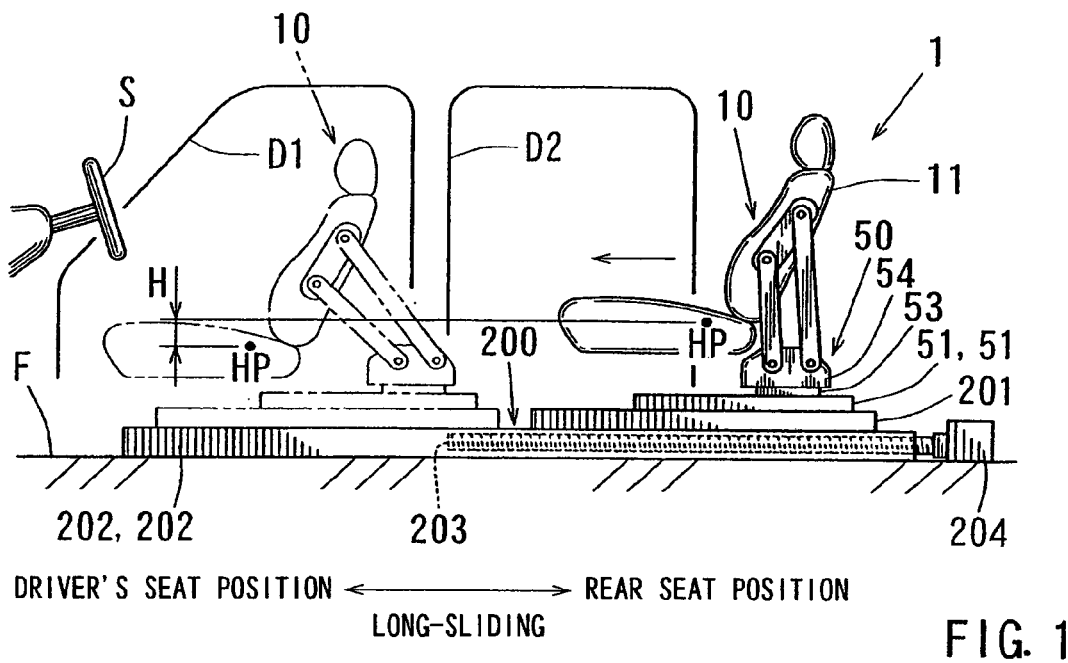
FIG. 1 is a side view of a first embodiment of the present invention, illustrating a condition in which a seat unit is long-slid from a rear seat position behind a driver's seat to a driver's seat position.
Figure 2:
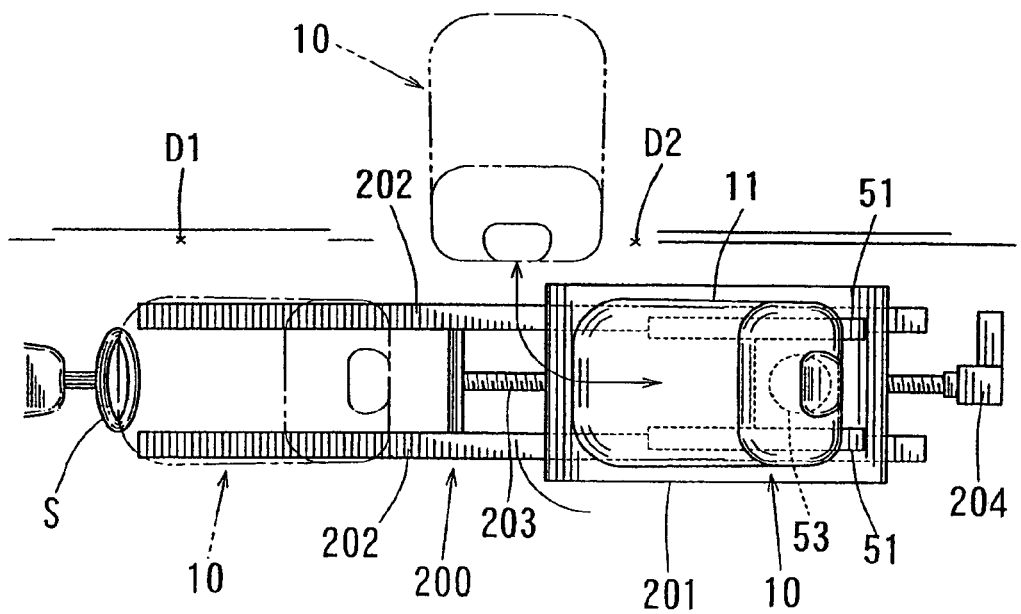
FIG. 2 is a plan view of the first embodiment of the present invention, illustrating a condition in which a seat unit is long-slid from the rear seat position behind the driver's seat to the driver's seat position after it is moved from the exterior of a vehicle cabin to the rear seat position behind the driver's seat.

A first embodiment of the present invention will now be described with reference to FIGS. 1 to 10. FIGS. 1 and 2 show a vehicle seat 1 according to this embodiment. This vehicle seat 1 is a seat that is used as a driver's seat. The vehicle seat 1 has a seat unit 10, a lift-up unit 50 and a long-sliding unit 200. The lift-up unit 50 serves to move the seat unit 10 from the interior of a vehicle cabin to the exterior of the vehicle cabin or vice versa. The long-sliding unit 200 serves to move the seat unit 10 over a relatively long distance between a rear seat position behind the driver's seat and a driver's seat position (long-sliding).

In FIGS. 1 and 2, the seat unit 10 that is positioned at the rear seat position behind the driver's seat is indicated by solid lines, and the seat unit 10 that is positioned at the driver's seat position is indicated by chain double-dashed lines. In the following description, a seat position in which a driver sits will be referred to as "a driver's seat position," and a seat position in which a person other than the driver sits will be referred to as the "a passenger seat position." In this embodiment, the rear seat position behind the driver's seat is used as the passenger seat position, in which the seat unit is moved from the interior of the vehicle cabin to the exterior of the vehicle cabin or vice versa. Thus, in this embodiment, the seat unit 10 is moved between the interior of the vehicle cabin and the exterior of the vehicle cabin by means of the lift-up unit 50 via a door opening portion D2 for the rear seat behind the driver's seat.

The seat unit 10 has foldable wheels (not shown in FIGS. 1 and 2). Further, the seat unit 10 can be connected to and removed from the lift-up unit 50. By moving the lift-up unit 50, with the seat unit 10 connected to the lift-up unit 50, the seat unit 10 can be moved from the interior of the vehicle cabin to the exterior of the vehicle cabin or vice versa. When the seat unit 10 is moved to the interior of the vehicle cabin, the seat unit 10 can be used as the driver's seat on which the driver sits. In addition, by separating the seat unit 10 from the lift-up unit 50 and by unfolding the wheels after the seat unit 10 is moved to the exterior of the vehicle cabin, the seat unit 10 itself can be used as a wheelchair.

FIGS. 3 to 9 show the seat unit 10 and the lift-up unit 50 in detail.

Figure 3:
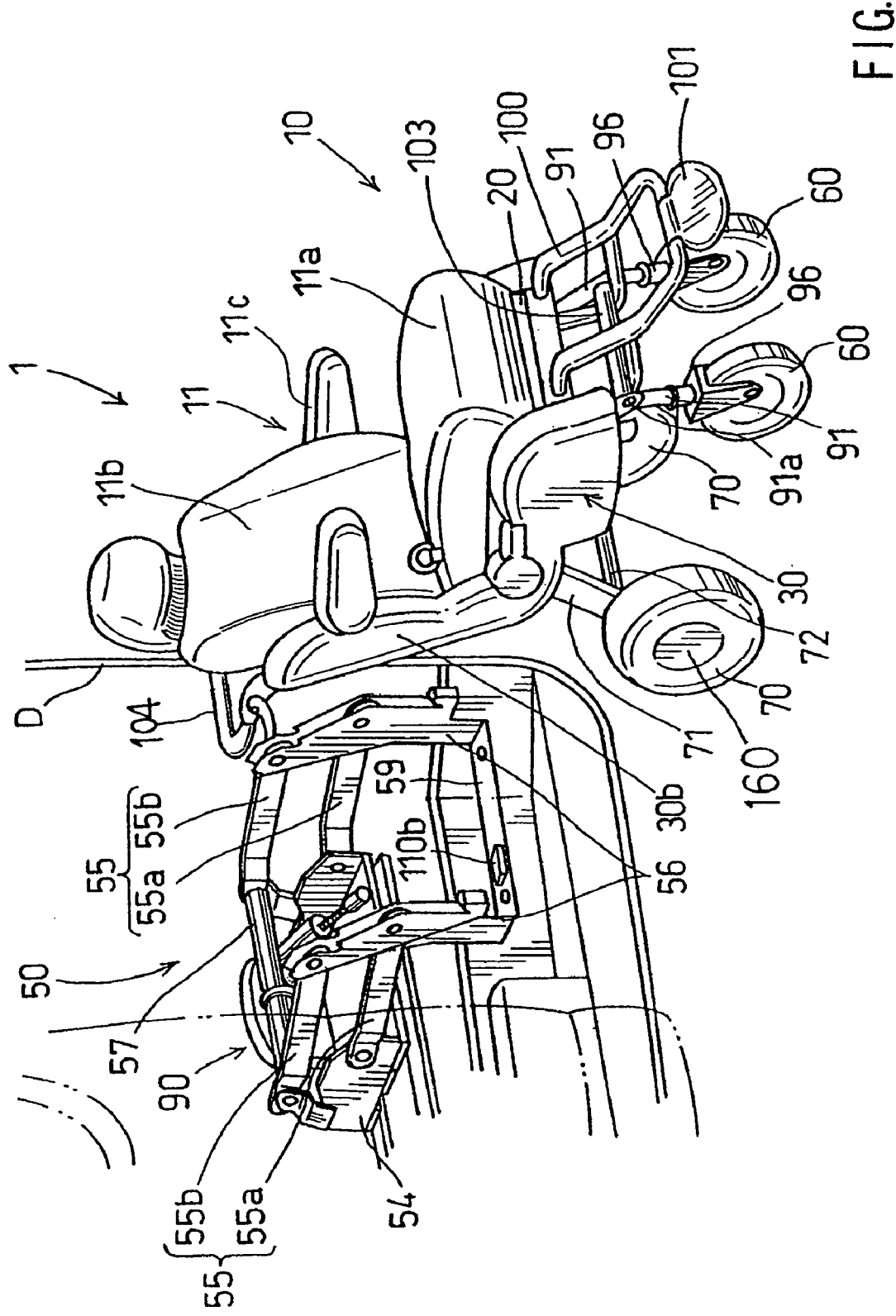
FIG. 3 is a perspective view of the seat unit and a lift-up unit, illustrating a condition in which the seat unit is spaced apart from the lift-up unit.
Figure 4:
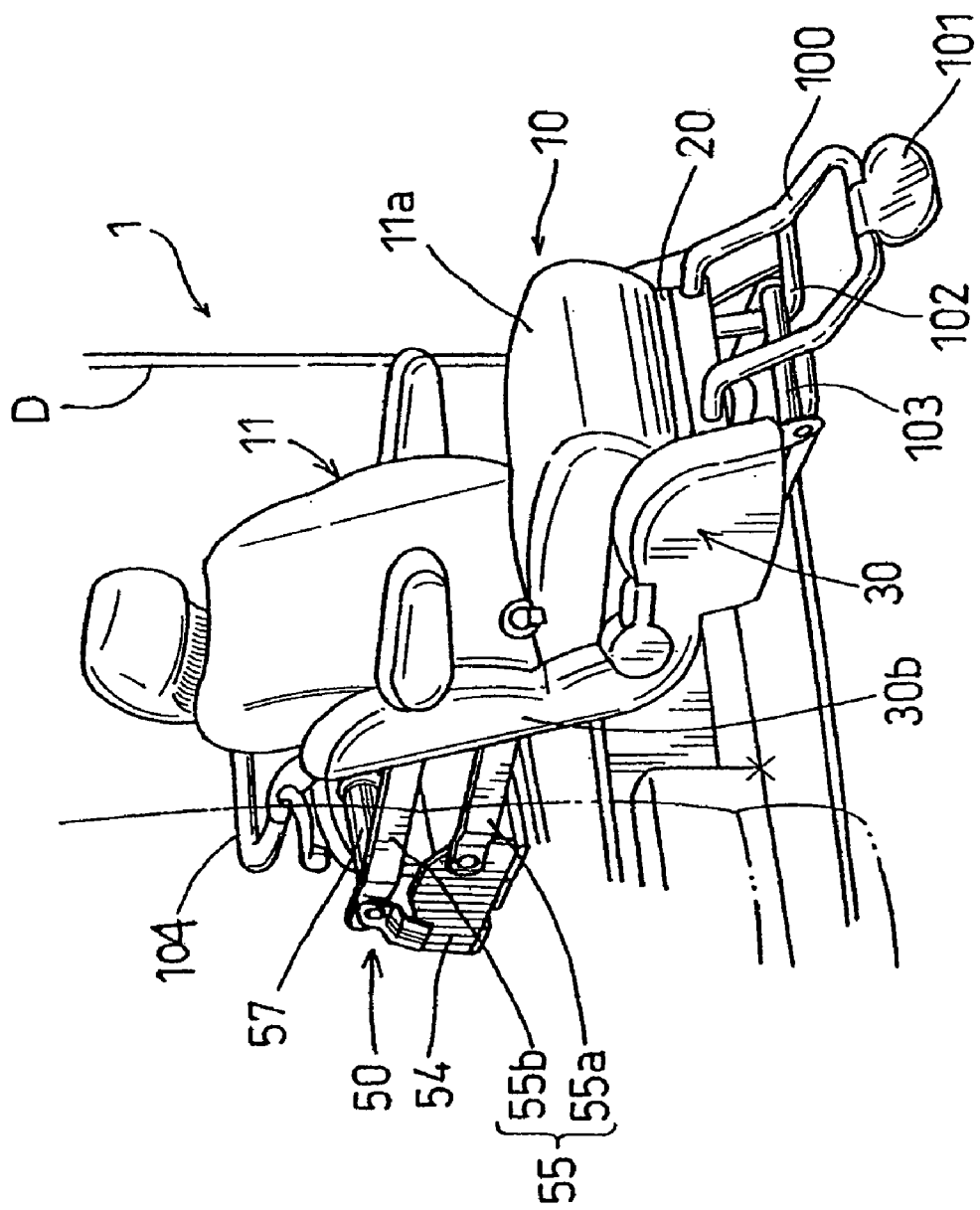
FIG. 4 is a perspective view of the seat unit and the lift-up unit, illustrating a condition in which the seat unit passes through a door opening portion while it is connected to the lift-up unit.

As shown in FIGS. 3 and 4, the seat unit 10 has a seat main body 11 and front and rear foldable wheels 60, 60 and 70, 70. The seat main body 11 has a seat cushion 11a and a seat back 11b and is secured to a seat frame 20.

Figure 5:
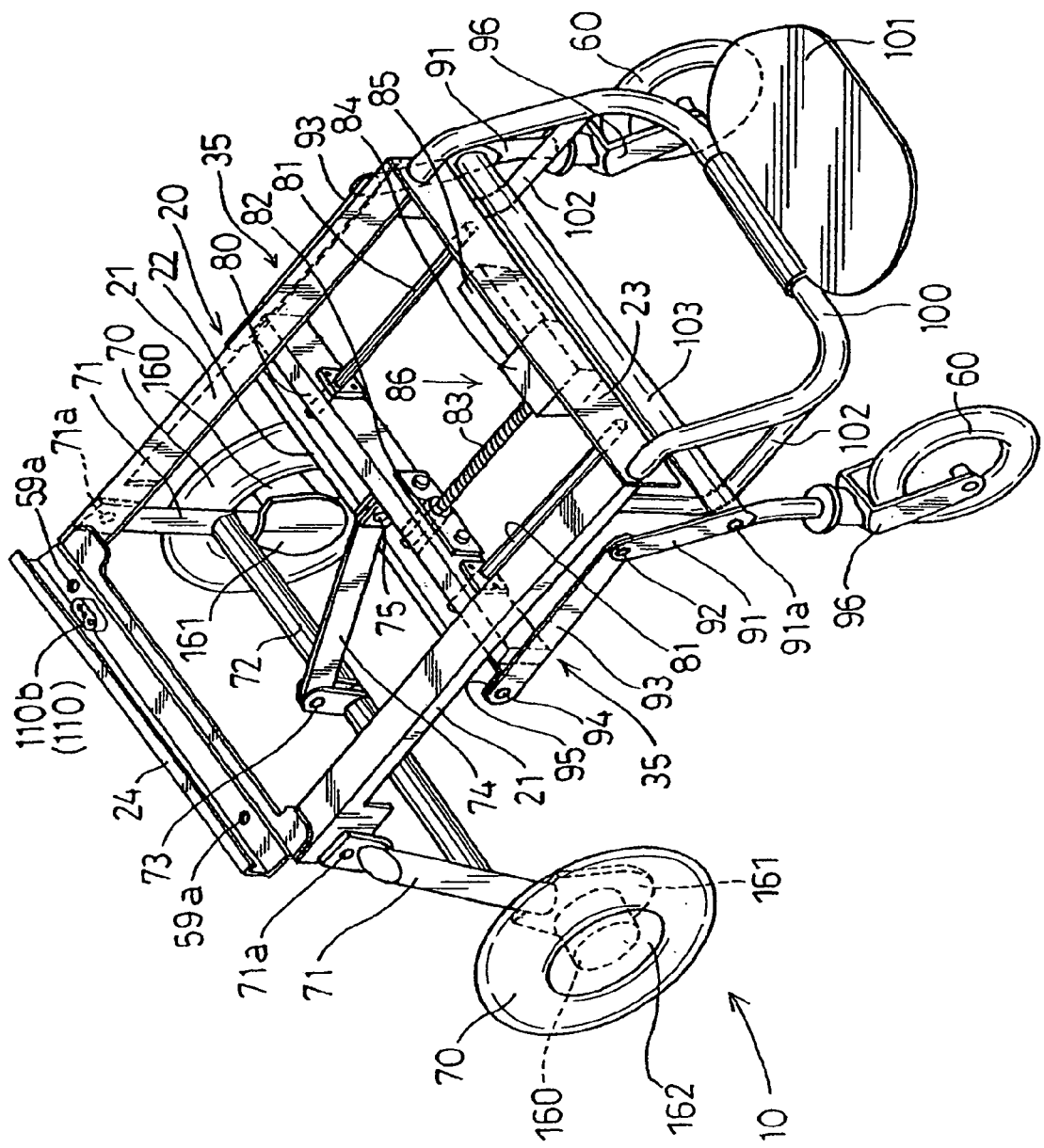
FIG. 5 is a perspective view of the seat unit.

FIG. 5 shows the seat unit 10 in which the seat main body 11 is removed therefrom. The front wheels 60, 60 and the rear wheels 70, 70 are foldably mounted to the seat frame 20 via a synchronizing mechanism 35.

Upper portions of rear wheel stays 71, 71 are respectively supported on rear portions of right and left side frames 21, 21 of the seat frame 20 via pivots 71a, so as to be vertically rotatable. Respectively mounted to the lower end portions of the rear wheel stays 71, 71 are the rear wheels 70 each having a built-in type wheel-in motor 160.

Mounted to the lower end portion of each rear wheel stay 71 is a substantially plate-shaped motor bracket 161. The wheel-in motor 160 is mounted to the outer side surface of this motor bracket 161. This wheel-in motor 160 is compactly incorporated in the inner periphery side of a hub 162 of each rear wheel 70. In this embodiment, wheels having a relatively small diameter (approximately 8 inch) are used as the rear wheels 70.

The wheel-in motors 160 are driven by DC power supplied from a battery via electrical wiring (not shown). The battery as a power source is positioned on the back surface of the seat back 11b. This battery is recharged by a battery charger that is provided on the lift-up unit 50 side, with the seat unit 10 connected to the lift-up unit 50.

A handle portion 104 that is provided on the upper portion of the seat back 11b is equipped with operating switches (not shown) for performing starting and stopping operations, switching operations between low and high speeds, and switching operations between normal and reverse rotations of the wheel-in motors 160, 160. These operating switches are positioned such that a helper can quickly and easily operate the switches when the helper grips the handle portion 104 in order to move the seat unit 10.

Further, arm rests 11c of the seat main body 11 are equipped with joy stick type operating levers (not shown), so that a seated person can perform moving and stopping operations, switching operations between low and high speeds and switching operations between advancing and retreating movement with regard to the seat unit 10.

By operating the operating levers, it is possible to rotate the rear wheels 70, 70 by the wheel-in motors 160, 160, thereby travelling the seat unit 10.

The rotation of the wheel-in motors 160, 160 are respectively independently controlled by means of a motor control circuit (not shown). This motor control circuit performs switching operations of rotating directions, switching operations of revolutions or other like with regard to the wheel-in motors 160, 160. Thus, it is possible to perform switching operations between advancing and retreating movement, the switching operations between low and high speeds and right and left steering operations with regard to the seat unit 10. These operations can also be performed by operating the operating switches provided on the handle portion 104 and the joy stick type operating levers provided on the arm rests 11c of the seat main body 11.

As shown in FIG. 5, the rear wheel stays 71, 71 are connected to each other via a connecting rod 72. Therefore, the rear wheel stays 71, 71 may integrally rotate in the vertical direction. The rear end portion of a rear wheel link arm 74 is connected to the longitudinal central portion of the connecting rod 72 via a pivot 73, so as to be vertically rotatable. The front end portion of the rear wheel link arm 74 is rotatably connected to the longitudinal central portion of a moving frame 80 via a pivot 75. The moving frame 80 will be hereinafter described.

A front frame 23, a middle frame 22 and a rear frame 24 are attached to the side frames 21, 21 of the seat frame 20, so as to extend therebetween. A foot rest support frame 100 is attached to the front frame 23. Provided at the central portion of the foot rest support frame 100 is a plate-like foot rest 101, which can be used in a substantially horizontal position and be retracted in a vertical position. L-shaped support frames 102, 102 are attached to both sides of the footrest support frame 100. A connecting rod 103 is attached to the support frames 102, 102, so as to extend therebetween. The substantially central portions of front wheel stays 91 are connected to the end portions of the connecting rod 103 via pivots 91a, so as to be vertically rotatable.

Mounted to the lower portion of each of these front wheel stays 91, 91 is a U-shaped front wheel bracket 96 that is rotatable around the axis of the front wheel stay 91. Front wheels 60 are respectively rotatably attached to the front wheel brackets 96. Thus, the front wheels 60, 60 can swing with respect to the front wheel stays 91 (i.e., the rotation axes of the front wheels 60 being movable along a horizontal plane).

On the other hand, the front end portions of front wheel link arms 93 are rotatably connected to the upper end portions of the front wheel stays 91, 91 via pivots 92. The rear end portions of the front wheel link arms 93 are rotatably connected to end portions of the moving frame 80 via pivots 94 and L-shaped brackets 95.

Between the front frame 23 and the middle frame 22 of the seat frame 20, two slide bars 81 are positioned in parallel. The moving frame 80 is supported by means of the two slide bars 81, 81, so as to be slidable back and forth.

A nut 82 is attached to substantially the central portion of the moving frame 80. Further, a screw shaft 83 is passed through the nut 82, so as to be threadedly engaged therewith. The rear end portion of the screw shaft 83 is rotatably supported by the middle frame 22, and the front end portion of the screw shaft 83 is connected to a driving motor 85 via a gear box 84. A pulse motor is used as the driving motor 85. Starting, stopping, rotating amount (rotating angle), rotating direction, rotating speed or other like of the pulse motor is controlled by a control unit (drive circuit) (not shown).

When the driving motor 85 is normally or reversely rotated, the screw shaft 83 is normally or reversely rotated via the gear box 84. Therefore, due to the thread engagement of the screw shaft 83 and the nut 82, the moving frame 80 is translated forwards or backwards. A driving device 86 for folding the front and rear wheels 60, 60 and 70, 70 is formed by a mechanism for translating the moving frame 80, i.e., mainly by the driving motor 85, the screw shaft 83 and related components thereof.

For example, when the driving motor 85 is normally rotated, so that the moving frame 80 is forwardly translated, the front wheel link arms 93, 93 forwardly move. Thus, the front wheel stays 91, 91 rotate clockwise (in such a direction as to backwardly move the front wheels 60) around the pivots 91a and as a result, both the front wheels 60, 60 are backwardly folded. Further, when the moving frame 80 is forwardly translated, the rear wheel link arm 74 forwardly moves, thereby forwardly moving the connecting rod 72. Thus, the rear wheel stays 71, 71 rotate counterclockwise and as a result, both the rear wheels 70, 70 are forwardly folded.

On the other hand, when the driving motor 85 is reversely rotated, the moving frame 80 is backwardly translated, the front wheel link arms 93, 93 backwardly move. Thus, the front wheel stays 91, 91 rotate counterclockwise around the pivots 91a and as a result, both the front wheels 60, 60 are downwardly unfolded from its folding position. Further, when the moving frame 80 is backwardly translated, the rear wheel link arm 74 backwardly moves. Thus, the rear wheel stays 71, 71 rotate clockwise around the pivots 71a and as a result, both the rear wheels 70, 70 are downwardly unfolded from its folding position.

In this way, when the moving frame 80 moves forwardly or backwardly by means of the driving device 86, the synchronizing mechanism 35 functions so that the front wheels 60, 60 and the rear wheels 70, 70 are simultaneously upwardly folded or downwardly unfolded.

The front wheels 60, 60, when upwardly folded, are engaged with guides (not shown) formed in the rear wheel stays 71, 71, so that their posture is forcibly changed from a vertical posture to a horizontal posture. Here, the vertical posture corresponds to a state in which the rotation axes (axles) of the front wheels 60 extend in the horizontal direction (parallel to the ground surface). The horizontal posture corresponds to a state in which the rotation axes of the front wheels 60 extend in the vertical direction (in the direction perpendicular to the ground surface).

In this way, because the posture of the front wheels 60, 60 is changed to the horizontal posture when the front wheels 60, 60 are folded, it is possible to reduce the downwardly projecting dimension of the front wheels 60, 60. As a result, it possible to reduce the height of the seat unit 10 in the vehicle cabin. Therefore, the person seated on the seat unit 10 may have substantially the same seating level as the other passengers.

Figure 6:
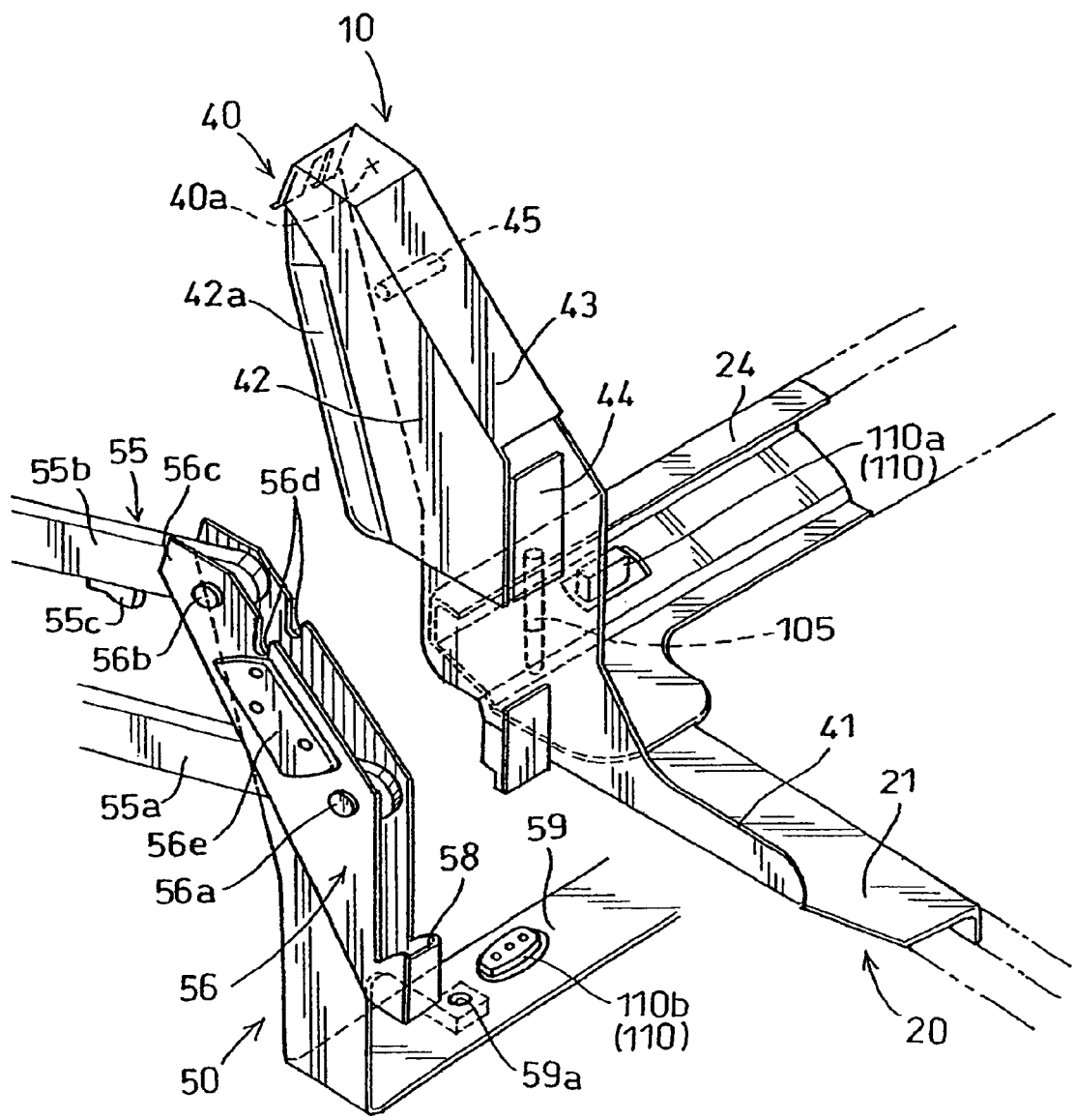
FIG. 6 is a perspective view of a portion around a connecting portion of the seat unit and a connecting plate of the lift-up unit.
Figure 7:
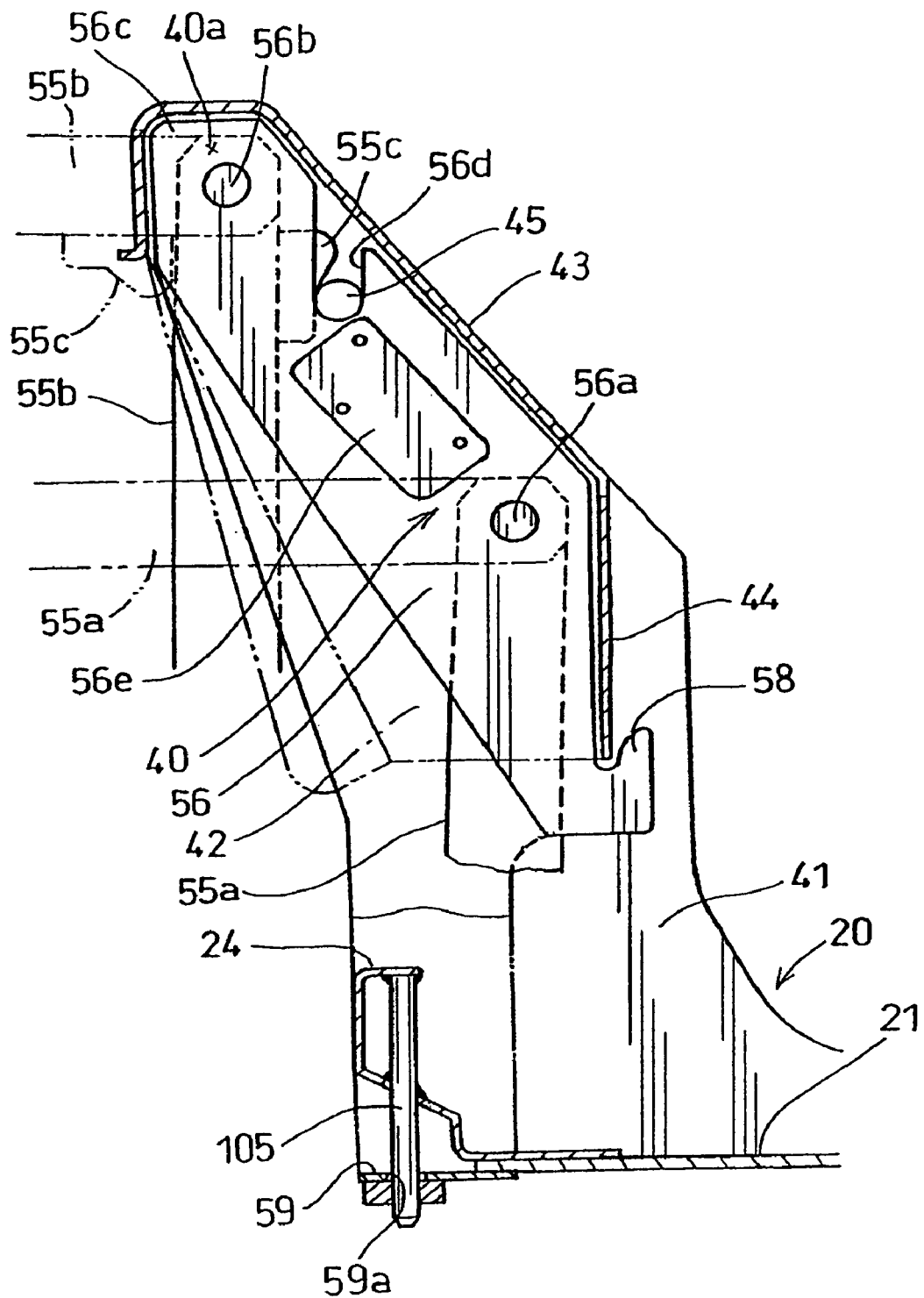
FIG. 7 is a side view illustrating a condition in which the connecting plate of the lift-up unit is connected to the connecting portion of the seat unit.

As shown in FIGS. 3 and 4, right and left cover members 30, 30 are provided with upwardly extending portions 30b that extend along the side portions of the seat back 11b. Provided in these upwardly extending portions 30b are connecting portions 40 for connecting the seat unit 10 to the lift-up unit 50. The connecting portions 40 are shown in FIGS. 6 and 7 in detail.

Because the connecting portions 40, 40 are symmetrically constructed with respect to each other, the connecting portion 40 that is positioned on the right-hand side of the seating person will be described with reference to FIGS. 6 and 7. A substantially L-shaped first side plate 41 is vertically connected to the rear portion of the right side frame 21 of the seat frame 20. Fixed to the upper portion of the first side plate 41 is a second side plate 42 that is parallel to and spaced apart from the first side plate 41 by a desired distance. Positioned on the front side of a space formed between the two side plates 41 and 42 is a an upper front plate 43 and a lower front plate 44. The upper portion of the upper front plate 43 is bent to a reverse-U-shape. Thus, formed in the upper portion of the connecting portion 40 is an engagement recess 40a for holdably engaging an upper portion 56c of a connecting plate 56 of the lift-up unit 50.

The side plates 41 and 42, the upper front plate 43 and the lower front plate 44 may form the substantially box-shaped connecting portion 40 that has opening portions in the rear and lower portions. The connecting plate 56 of the lift-up unit 50 is fitted into the engagement recess 40a of the connecting portion 40 via the opening portions in the rear and lower portions. As shown in FIG. 6, formed at the rear end edge of the second side plate 42 is a guide edge 42a that is bent outwardly, so as to have a substantially constant width. This guide edge 42a serves as a guide plate when the connecting plate 56 of the lift-up unit 50 is fitted into the engagement recess 40a of the connecting portion 40.

When the connecting plates 56, 56 of the lift-up unit 50 are respectively fitted into the engagement recesses 40a of the right and left connecting portions 40, 40, the seat unit 10 is connected to the lift-up unit 50. Secured to the upper portion of the interior of each engagement recess 40a is a lock bar 45, which bar is transversely positioned. When the lock bar 45 engages the connecting plate 56 of the lift-up unit 50, the connecting plate 56 and the connecting portion 40 are locked into a connected state.

Figure 9:
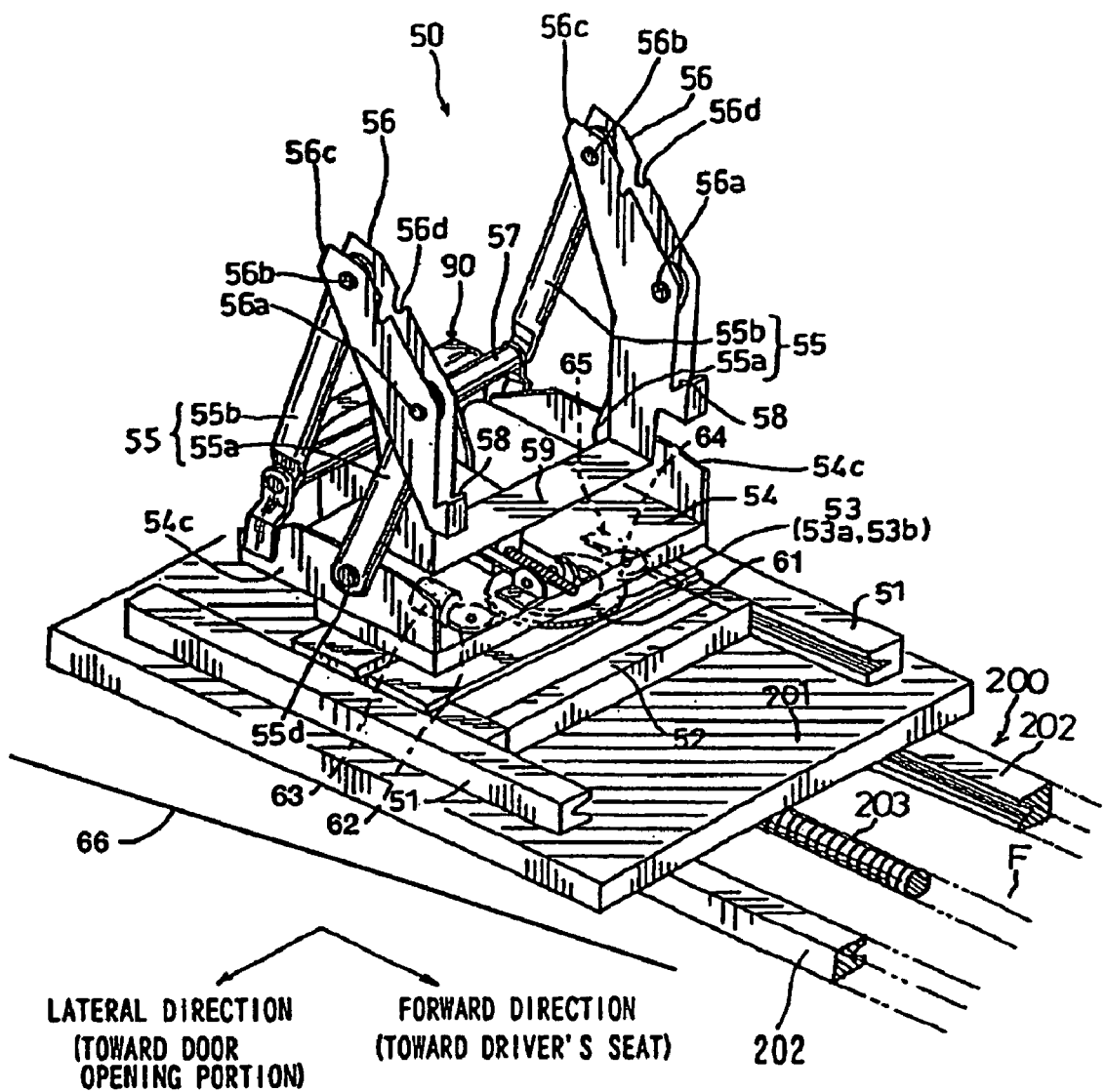
FIG. 9 is a perspective view of the lift-up unit.
Figure 9A:
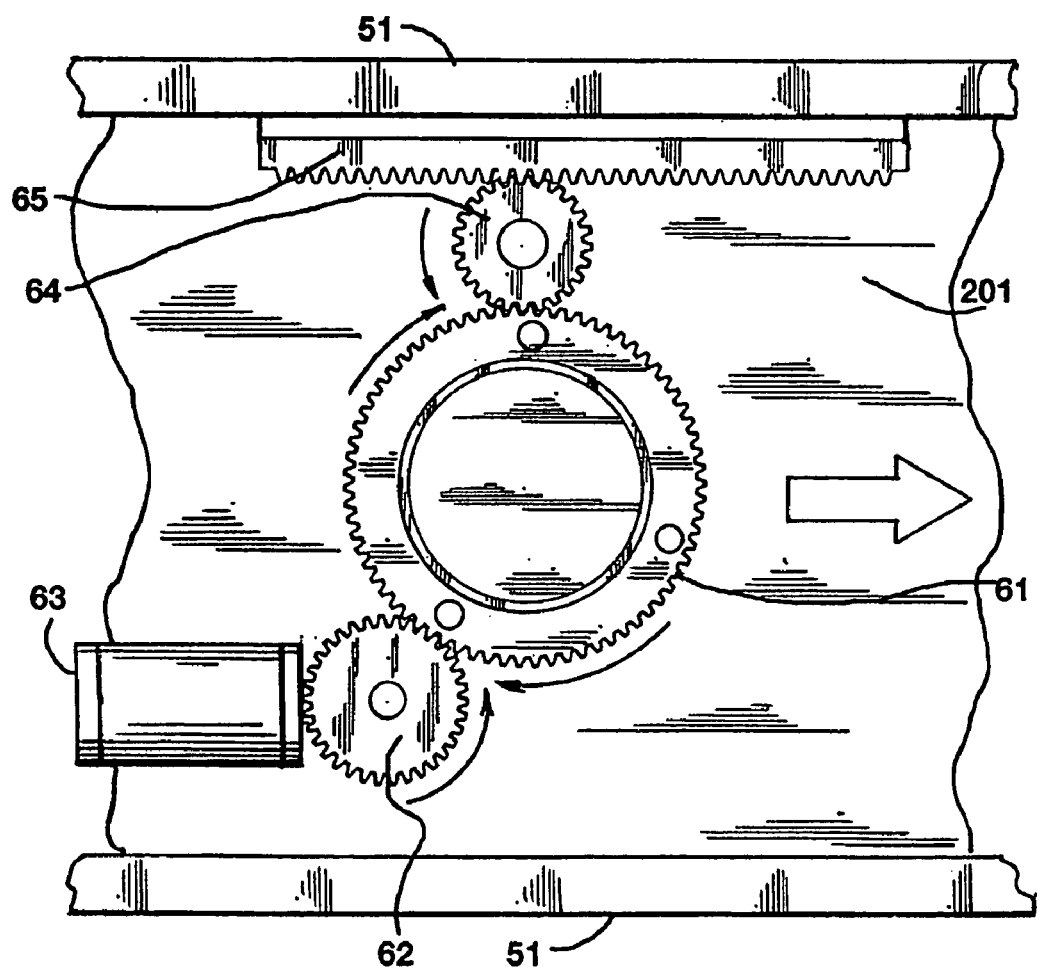
FIG. 9A is an enlarged perspective view of a portion of the lift-up unit of FIG. 9.

As shown in FIG. 9, the lift-up unit 50 is mounted on a main base 201 of the long-sliding unit 200 that is mounted on a vehicle floor F.

The lift-up unit 50 has two short-slide rails 51, 51, a sub base 52, a rotary device 53, a swing base 54 and right and left four-bar linkage mechanisms 55, 55. The two short-slide rails 51, 51 are mounted on the main base 201, so as to extend in a longitudinal direction of the vehicle. The sub base 52 is attached to the short-slide rails 51, 51, so as to be movable in the longitudinal direction of the vehicle. The swing base 54 is rotatably supported on the sub base 52 by means of the rotary device 53 that is provided on the sub base 52. The four-bar linkage mechanisms 55, 55 are mounted on both sides of the swing base 54. Further, the sliding motion along the long-sliding unit 200 will be hereinafter referred to as "long-sliding motion." On the other hand, the sliding motion along the short-slide rails 51, 51 will be hereinafter referred to as "short-sliding motion."

The rotary device 53 has an outer ring 53a and an inner ring 53b that are assembled, so as to be rotatable relative to each other. In this embodiment, the inner ring 53b is connected to the sub base 52, and the outer ring 53a is connected to the lower surface of the swing base 54. The swing base 54 is supported by means of the rotary device 53, so as to be rotatable by approximately 90 degrees between a position where it faces the front side of the vehicle and a position where it faces a lateral side of the vehicle (a side corresponding to the door opening portion D2 shown in FIGS. 1 and 2). The swing base 54 can be fixedly retained by means of a rotation lock mechanism (not shown) at the position where it faces the front side of the vehicle and the position where it faces a lateral side of the vehicle.

Further provided between the swing base 54 and the main base 201 is a synchronizing mechanism for synchronizing the rotating motion and the short-sliding motion of the swing base 54, and consequently, of the seat unit 10. This synchronizing mechanism has a pinion gear portion 61, an intermediate gear 64 and a rack 65. The pinion gear portion is formed in the outer peripheral surface of the outer ring 53a. The intermediate gear portion 64 meshes with the pinion gear portion 61 and is rotatably supported on the sub base 52. The rack is mounted on the main base 201, so as to extend along the short-slide rail 51 that is inwardly positioned in the vehicle cabin. Further, the pinion gear portion 61 meshes with a driving gear 62 that is rotated by a driving motor 63. Thus, when the driving motor 63 is rotated in a normal direction or a reverse direction, the seat unit 10 rotates in a direction in which it faces the front side of the vehicle or a direction in which it faces the door opening portion D2 and at the same time, performs the short-sliding motion along the short-slide rails 51, 51.

A pulse motor is used as the driving motor. Starting, stopping, rotating amount (rotating angle), rotating direction, rotating speed or other like of this pulse motor is controlled by a drive circuit of a control unit.

Each of the four-bar linkage mechanisms 55, 55 respectively includes two link arms 55a and 55b. The lower end portions of the front link arms 55a, 55a are vertically pivotally connected to pivots 55d, 55d that are provided on side wall portions 54c of the swing base 54. The lower end portions of the rear link arms 55b, 55b are interconnected by a single connecting shaft 57 that is adapted to rotate with respect to the side wall portions 54c of the swing base 54. Further, the link arms 55b, 55b are connected by the connecting shaft 57, so as to be vertically rotatable with respect to the swing base 54.

Connected to the connecting shaft 57 is an electric cylinder 90 that serves as the drive source for operating the four-bar linkage mechanisms 55, 55. The electric cylinder 90 is the conventionally known electric cylinder that is constructed of a combination of a driving motor and a screw shaft feeding mechanism. A pulse motor is used as a driving motor of this electric cylinder 90. Operation of starting, stopping or other like of the pulse motor is controlled by a drive circuit (not shown) of a control unit. Thus, tilting direction, tilting speed and tilting angle of the four-bar linkage mechanisms 55, 55 are controlled.

The connecting plates 56 are respectively attached to the forward ends of the four-bar linkage mechanisms 55, 55. The upper end portions of the front and rear link arms 55a and 55b are rotatably connected to the connecting plates 56, 56 via pivots 56a and 56b.

As shown in FIGS. 6 and 7, each of the connecting plates 56, 56 has a substantially flat plate-like configuration, so as to be fitted into the connecting portions 40, 40 of the seat unit 10 substantially without leaving a gap therebetween. When the upper portions 56c of the connecting plates 56 are fitted into the engagement recesses 40a of the connecting portions 40, the upper portions 56c of the connecting plates 56 are prevented from rearwardly (leftwardly in FIG. 7) displacing with respect to the engagement recesses 40a.

The connecting plates 56, 56 are formed with lock claws 58, 58 in their lower portions. These lock claws 58 may engage the lower front plates 44 of the connecting portions 40 from the under side thereof. This may also prevent the upper portions 56c of the connecting plates 56 from rearwardly displacing with respect to the engagement recesses 40a of the connecting portions 40.

Further, the front sides of the connecting plates 56, 56 are formed with notch-like lock recesses 56d. Further, as shown in FIGS. 6 and 7, formed in the rear link arms 55b, 55b of the four-bar linkage mechanisms 55 are blocks 55c that are positioned adjacent to the pivots 56b. As shown in FIG. 7, when the connecting plates 56, 56 are connected to the connecting portions 40, the lock bars 45 of the connecting portions 40 are fitted into the lock recesses 56d. As a result, the upper portions 56c of the connecting plates 56 are prevented form rearwardly displacing with respect to the engagement recesses 40a of the connecting portions 40.

It is noted that when the seat unit 10 is moved into the vehicle cabin by means of the lift-up unit 50, as shown in FIG. 7, the front and rear link arms 55a and 55b are substantially upright. At this time, the blocks 55c provided on the rear link arms 55b protrude over the lock bars 45. As a result, the lock bars 45 are prevented from coming out of the lock recesses 56d. That is, the connecting plates 56 are prevented from coming out of the engagement recesses 40a of the connecting portion 40.

Sliding plates 56e, 56e having a predetermined thickness are attached to side surfaces of the connecting plates 56, 56. Due to these sliding plates 56e, 56e, the connecting plates 56, 56 can be smoothly fitted into the connecting portions 40 without producing any play in the plate thickness direction (in a crosswise direction of the seat unit 10).

The lower end portions of the connecting plates 56, 56 are connected together by a receiving frame 59. In the state in which the seat unit 10 is connected to the lift-up unit 50, the receiving frame 59 is positioned under the rear frame 24 of the seat frame 20 of the seat unit 10 in a substantially overlapping relationship.

Figure 8:
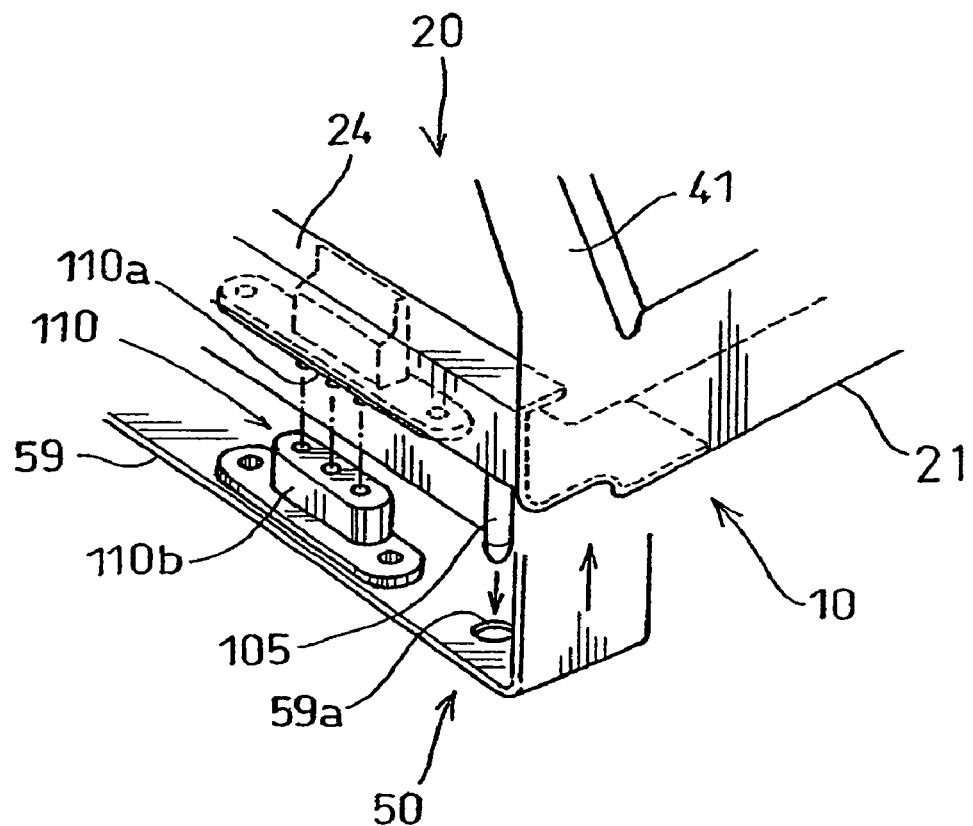
FIG. 8 is a perspective view illustrating a condition in which a rear frame of a seat frame is connected to a receiving frame of the lift-up unit, and in which male and female portions of a power source connector are connected together and a positioning pin is positioned.

As shown in FIG. 8, attached to the rear frame 24 are two downwardly projecting positioning pins 105 that are positioned adjacent to the right and left side frames 21, 21. On the other hand, corresponding positioning holes 59a, 59a are formed in the receiving frame 59. The positioning pins 105 are inserted into the positioning holes 59a, 59a, thereby positioning the lift-up unit 50 with respect to the seat unit 10.

Further, the rear frame 24 of the seat frame 20 is provided with a male portion 110a of a power connector (junction connector) 110. On the other hand, the receiving frame 59 is provided with a female portion 10b of the power connector 110.

Thus, when the seat unit 10 is connected to the lift-up unit 50, the rear frame 24 of the seat frame 20 is positioned on the receiving frame 59 in the substantially overlapping relationship. At the same time, the male portion 110a of the power connector 110 is also connected to the female portion 110b, thereby forming electrical connection between the seat unit 10 and the lift-up unit 50. The male portion 110a of the power connector 110 is connected to the driving motor 85 and a power battery of the driving device 86. On the other hand, the female portion 110b of the power connector 110 is connected to a control unit and a charging device (both of which are not shown). Thus, when the male portion 110a and the female portion 10b of the power connector 110 are connected to each other, the driving motor 85 of the driving device 86 can be controlled by the control unit, so that the front wheels 60, 60 and the rear wheels 70, 70 can be folded or unfolded. At the same time, the power battery for supplying DC power to the wheel-in motors 160, 160 is recharged by the charging device. Thus, it is possible to recharge the power battery of the seat unit 10 during travel of the vehicle.

Next, the long-sliding unit 200 for moving the seat unit 10 and the lift-up unit 50 between the driver's seat position and the rear seat position behind the driver's seat will be described.

The long-sliding unit 200 has two long-slide rails 202, a main base 201, a screw shaft 203 and a long-slide motor 204.

The long-slide rails 202, 202 are positioned between the driver's seat position and the rear seat position and mounted on the vehicle floor F, so as to be parallel to each other. The long-slide rails 202, 202 are arranged, so as to be slightly sloped downwardly from the rear seat position toward the driver's seat position as indicated at 66. The main base 201 is supported on the two long-slide rails 202, 202, so as to move therealong.

The screw shaft 203 is rotatably provided between the long-slide rails 202, so as to be parallel thereto. The screw shaft 203 is rotated by the long-slide motor 204. Further, the screw shaft 203 meshes with a nut that is attached to the lower surface of the main base 201. Thus, when the screw shaft 203 is rotated by the long-slide motor 204, the main base 201 moves from the driver's seat position toward the rear seat position or vice versa. When the main base 201 moves, the lift-up unit 50 that is provided on the main base 201, the seat unit 10 and the driver seated on the seat main body 11 move between the driver's seat position and the rear seat position. A pulse motor is used as the long-slide motor 204. Starting, stopping, rotating amount (rotating angle), rotating speed, rotating direction or other like of the long-slide motor 204 is controlled by a drive circuit (not shown) of a control unit.

In this embodiment, the control unit is programmed such that the long-slide motor 204 is stopped before the seat unit 10 reaches the driver's seat position, and then the electric cylinder 90 of the lift-up unit 50 is operated, which will be hereinafter described.

As shown in FIG. 3, in the vehicle seat 1 thus constructed, by detaching the seat unit 10 from the lift-up unit 50, the seat unit 10 can be independently used as a wheelchair. In a state in which the seat unit 10 is separated from the lift-up unit 50, the front wheels 60, 60 and the rear wheels 70, 70 of the seat unit 10 have been unfolded downwardly.

In the state in which the seat unit 10 is separated from the lift-up unit 50, for example, when the helper operates the operating switches provided on the handle portion 104 or when the seating person operates the operating switches provided on the arm rest 11c, the wheel-in motors 160, 160 can be controlled, thereby rotating the rear wheels 70, 70. Thus, the helper can easily move the seat unit 10 and as a result, burden on the helper is remarkably reduced. In addition, because the seating person can travel the seat unit 10, the seating person can independently move without any assistance of the helper.

If the right and left wheel-in motors 160, 160 are reversely rotated by operating the operating switches of the handle portion 104 or the arm rest 11c, the seat unit 10 can be reversely traveled. Further, if the rotating speeds of the wheel-in motors 160, 160 are changed, the moving speed of the seat unit 10 can be changed. Moreover, if the wheel-in motors 160, 160 are controlled such that their rotating speeds are different from each other, the seat unit 10 can be turned to the left or the right.

The operation of moving the seat unit 10 from the exterior of the vehicle cabin to the interior of the vehicle cabin will be described below. The following operation can be performed under a condition in which the seating person remains seated on the seat unit 10.

First, an operating switch (e.g., an exterior moving switch) of an operation panel that is separately provided is manipulated. Thus, the lift-up unit 50 is rotated to the position where it faces the exterior of the vehicle cabin, and then the four-bar linkage mechanisms 55; 55 of the lift-up unit 50 pivotally rotate in their projecting directions, thereby projecting the connecting plates 56, 56 toward the exterior of the vehicle cabin. This series of operations are performed while the exterior moving switch is manipulated.

Next, the seat unit 10 is turned backward and is moved toward the lift-up unit 50 (backward movement), so that the receiving frame 59 is positioned under the rear frame 24 of the seat frame 20.

Next, an operating switch of the operation panel (e.g., an interior moving switch) is manipulated. The following series of operations are performed while the interior moving switch is manipulated and are stopped when the manipulation of the interior moving switch is canceled.

By manipulating the interior moving switch, the electric cylinder 90 is operated and the four-bar linkage mechanisms 55, 55 of the lift-up unit 50 are slightly moved in an erecting direction. As a result, the connecting plates 56, 56 and the receiving frame 59 are integrally raised and the receiving frame 59 is overlapped to the rear frame 24 of the seat frame 20 from its underside. During this process, the positioning pins 105, 105 are inserted into the positioning holes 59a, 59a, so that the lift-up unit 50 is positioned with respect to the seat unit 10. Further, the male portion 110a and the female portion 10b of the power connector 110 are connected together.

Further, the connecting plates 56, 56 are raised and as a result, the connecting plates 56, 56 are fitted into the connecting portions 40, 40 of the seat unit 10. When the upper end portions 56c, 56c of the connecting plates 56, 56 are fitted into the engagement recesses 40a, 40a of the connecting portions 40, 40, the lock claws 58, 58 of the connecting plates 56, 56 engage the lower edges of the lower front plates 44 of the connecting portions 40 from its underside and the lock pins 45 are fitted into the lock recesses 56d of the connecting plates 56. As a result, the connecting plates 56, 56 are connected to the connecting portions 40. At this time, the connecting plates 56, 56 are prevented from laterally and backwardly moving with respect to the connecting portions 40 of the seat unit 10.

As described above, when the connecting plates 56, 56 are connected to the connecting portions 40, 40 while moving the four-bar linkage mechanisms 55, 55 of the lift-up unit 50 in the erecting direction (toward the interior of the vehicle cabin), and then the four-bar linkage mechanisms 55, 55 are continuously moved in the erecting direction, the seat unit 10 is raised from the ground. At this stage, the lift-up unit 50 is stopped temporarily. To stop the lift-up unit 50, pulses that are supplied to the driving motor of the electric cylinder 90 from the control unit is stopped. The state in which the seat unit 10 is raised slightly above the ground is confirmed by, for example, counting the number of the pulses supplied to the driving motor of the electric cylinder 90. When the seat unit 10 is slightly raised above the ground, as described below, the front wheels 60, 60 and the rear wheels 70, 70 can be folded.

Under the condition that the seat unit 10 is slightly raised above the ground, the driving motor 85 of the driving device 86 rotates, for example, in the normal direction. At this stage, DC power can be supplied to the driving motor 85 of the driving device 86 via the power connector 110. When the driving motor 85 rotates in the normal direction, the moving frame 80 forwardly moves and the front wheel link arms 93, 93 and the rear link arm 74 move in its folding direction (to the right in FIG. 5). When the front link arms 93, 93 move in the folding direction, the front wheel stays 91, 91 rotate in its folding direction around the pivots 91a (clockwise in FIG. 5) and as a result, the front wheels 60, 60 move in its folding direction. Further, when the rear link arms 93, 93 move in the folding direction, the rear wheel stays 71, 71 rotate in its folding direction around the pivots 71a (counterclockwise in FIG. 5) and as a result, the rear wheels 70, 70 move in its folding direction.

As stated above, at a final stage of the folding operation of the front wheels 60, 60 and the rear wheels 70, 70, the posture of the front wheels 60, 60 is forcibly changed from the vertical posture to the horizontal posture.

When the moving frame 80 reaches a forward slide end position (the folding positions of the front and rear wheels), the control unit stops the supply of pulses to the driving motor 85. The fact that the moving frame 80 has reached the forward slide end position can be detected from, for example, the number of pulses supplied to the driving motor 85, the rotating amount of the driving motor 85 or a limit switch provided at the forward end position.

After completion of the folding of the front wheels 60, 60 and the rear wheels 70, 70, the four-bar linkage mechanisms 55, 55 of the lift-up unit 50 are moved again in the erecting direction. Thus, the seat unit 10 is accommodated in the vehicle cabin while being raised, with the seating person seated thereon. When the four-bar linkage mechanisms 55, 55 are erected to an upright position (an erect state), the supply of pulses to the driving motor of the electric cylinder 90 is stopped, so that the operation of the lift-up unit is stopped. When the four-bar linkage mechanisms 55, 55 are in the erect state, the seat unit 10 is situated substantially above the swing base 54. At this time, the seat unit 10 is firmly secured in position above the swing base 54 by a lock device provided on the main base 201. Further, the fact that the four-bar linkage mechanisms 55, 55 are in the erect state can be detected from, for example, the number of pulses supplied to the driving motor of the electric cylinder 90, the rotating amount of the driving motor or the limit switch.

When the four-bar linkage mechanisms 55, 55 are in the erect state, the rear link arms 55b, 55b of the four-bar linkage mechanisms 55, 55 are substantially upright. At this time, as shown in FIG. 7, the blocks 55c provided on the link arms 55b, 55b protrude over the lock bars 45. As a result, the lock bars 45 are locked in the lock recesses 56d, 56d. That is, the seat unit 10 and the connecting portions 40, 40 are locked in the connected state.

When the driving motor of the electric cylinder 90 stops, with the seat unit 10 being positioned above the swing base 54, the driving motor of the rotary device 53 subsequently operates. That is, the seat unit 10 and the swing base 54 rotate by approximately 90 degrees from the position where they face a lateral side of the vehicle (the side corresponding to the door opening portion) to the position where they face the front side of the vehicle.

At this time, within a predetermined range of angle as measured from the position where it faces the lateral side of the vehicle, by means of the synchronizing mechanism, the seat unit 10 short-slides toward the rear side of the vehicle while rotating. This synchronization of the rotation and the short-sliding occurs, for example, within a rotational range of approximately 65 degrees as measured from the position where the seat unit 10 faces the lateral side of the vehicle. As a result, when the seat unit 10 passes through the door opening portion D2, the seat unit 10 can be prevented from contacting a pillar of a vehicle body (a peripheral edge portion of the door opening portion D2). The sliding motion at this stage is a short-sliding motion in which the sub base 52 moves along the short-slide rails 51, 51.

After the seat unit 10 has been rotated by approximately 65 degrees from the position where it faces the lateral side of the vehicle toward the position where it faces the front side of the vehicle, only the rotation of the seat unit 10 is performed.

The rotational range in which the synchronization of the rotation and the short-sliding of the seat unit 10 occurs can be variously changed over the entire rotational range. Further, if it is unlikely that the seat unit 10 will contact the pillar of the vehicle body when the seat unit 10 rotates, the short-sliding motion at this stage can be omitted.

When the seat unit 10 is rotated to the position where it faces the front side of the vehicle, the driving motor of the rotary device 53 stops. That is, the rotating motion and the short-sliding motion of the seat unit 10 are completed. At this stage, the seat unit 10 is moved toward the front side of the vehicle, so as to be restored to the rear seat position behind the driver's seat. Further, it is possible to omit the operation of restoring the seat unit 10 to the rear seat position behind the driver's seat. The fact that the seat unit 10 has been rotated to the position where it faces the front side of the vehicle is detected from, for example, the number of pulses supplied to the driving motor of the rotary device 53 or the rotating amount of the driving motor.

When the rotating motion of the seat unit 10 has been completed and the seat unit 10 has been restored to the rear seat position behind the driver's seat, the long-slide motor 204 subsequently rotates, for example, in the normal direction. Thus, the screw shaft 203 rotates in the normal direction and as a result, the seat unit 10 and the lift-up unit 50 move from the rear seat position behind the driver's seat toward the driver's seat position (long-sliding motion).

The long-sliding motion is carried out by controlling starting, stopping, rotating amount (rotating angle), rotating direction and rotating speed of the long-slide motor 204 by means of the control unit. At an initial stage of the long-sliding motion, the electric cylinder 90 of the lift-up unit 50 is not operated.

When the seat unit 10 reaches a predetermined position just behind the driver's seat position, the long-slide motor 204 stops to stop the long-sliding motion. The fact that the seat unit 10 has reached the predetermined position just behind of the driver's seat position is detected from, for example, the number of pulses supplied to the long-slide motor 204 or the rotating amount of the long-slide motor 204. Thereafter, the driving motor of the electric cylinder 90 of the lift-up unit 50 is again operated and the four-bar linkage mechanisms 55, 55 pivotally rotate in the projecting direction by a predetermined angle, for example, approximately 30 degrees. Thus, the seat unit 10 is forwardly projected and is positioned at the driver's seat position. This state is indicated by the chain double-dashed lines in FIG. 1. When the four-bar linkage mechanisms 55, 55 of the lift-up unit 50 pivotally rotate in the projecting direction by a predetermined angle, the seat unit 10 forwardly moves and is downwardly displaced (descends) by a height H.

In this way, by moving the four-bar linkage mechanisms 55 of the lift-up unit 50 in the projecting direction, the seat unit 10 can be positioned at the driver's seat position, which position is set to a height (hip point, HP) that is suitable for driving operation by the seating person (hip point lowering operation).

In this embodiment, the lift-up unit 50 has also a function as a "seat height adjusting device."

In this embodiment, the two long-slide rails 202, 202 are positioned, so as to be downwardly sloped from the rear seat position behind the driver's seat toward the driver's seat. Therefore, projecting amount (height H) of the seat unit 10 by the lift-up unit 50 can be reduced.

The position of the seat unit 10 after completion of the hip point lowering operation (the driver's seat position) is set to a rearmost position (rearmost: R/M) in the longitudinal direction of the vehicle, which position allows the seating person to fasten a seat belt in a proper position. Thus, after completion of the hip point lowering operation, it is possible to vary the position (seat position) of the seat unit 10 in the longitudinal direction of the vehicle, for example, by operating the long-sliding unit 200, within a range between a front-most position (front-most: F/M) in the longitudinal direction of the vehicle and the driver's seat position, which positions allow the seating person to fasten the seat belt in the proper position.

Further, if it is likely that the seating person contacts a steering wheel S or other such components when the seat unit 10 is projected by the lift-up unit 50, it is preferable to be constructed that the long-slide motor 204 is again driven after the hip point lowering operation is performed. According to this construction, the seat unit 10 can be positioned at the driver's seat position that is positioned in a forward portion of the vehicle after it is displaced downwardly by the height H.

While the downward displacement amount H may be fixedly set, it is preferable that such amount can be individually set for the seating person. Although the position where the hip point lowering operation is started may be fixedly set, it can be individually set for the seating person. In the case in which the downward displacement amount is individually set for the seating person, the control unit can be constructed such that the position where the hip point lowering operation is started is determined by the control unit based on the downward displacement amount.

In this way, the series of operations in which the seat unit 10 that can be independently used as the wheelchair is moved to the driver's seat position in the vehicle cabin are completed. Meanwhile, the seating person (driver) may remain seated on the seat unit 10. Thus, it is not necessary for the driver to transfer from the wheelchair to the vehicle seat, so that the driver can be very easily seated on the driver's seat from outside the vehicle.

In order to move the seat unit 10 from the driver's seat position to the exterior of the vehicle cabin such that the seat unit 10 can be independently used as a wheelchair, a series of operations reverse to those described above are carried out. During these operations, the seating person can remain seated on the seat unit 10. In this case, it is not necessary for the driver to transfer from the vehicle seat to the wheelchair, so that the driver can very easily move from the driver's seat to the exterior of the vehicle.

As described above, in the vehicle seat 1 of this embodiment, the seat unit 10 is moved from the interior of the vehicle cabin to the exterior of the vehicle cabin or vice versa via the door opening portion D2 that corresponds to the rear seat position behind the driver's seat position. Therefore, no obstruction such as the steering wheel S is involved unlike the case in which the seat unit 10 is moved via the door opening portion D1 (See FIG. 1) that corresponds to the driver's seat position. Further, the movement from the rear seat position behind the driver's seat position toward the driver's seat position is carried out by means of the long-sliding unit 200. In this case, because there is also no obstruction such as the steering wheel S, the seat unit can be moved very smoothly.

In this way, in the vehicle seat 1 of this embodiment, it is possible to smoothly move the seat unit 10 between the interior of the vehicle cabin and the exterior of the vehicle cabin and to use the seat unit 10 as the driver's seat. Therefore, even when an elderly person, a physically handicapped person or the like drives the vehicle, the driver can very easily move between the driver's seat and the wheelchair in the exterior of the vehicle cabin without transferring therebetween.

In the seat unit of the first embodiment described above, various modifications can be made. For example, although in the first embodiment, the lift-up unit 50 essentially consisting of the four-bar linkage mechanisms 55, 55 is used as a seat moving device for moving the seat unit 10 between the interior of the vehicle cabin and the exterior of the vehicle cabin via the door opening portion D2, a seat moving device essentially consisting of a slide mechanism can be used. In this case, an extendable slide mechanism that is adapted to be tilted by a predetermined angle can be preferably used. By using such a slide mechanism, the seat unit 10 can be moved to a seat position inside the vehicle cabin to a position outside the vehicle cabin, which position has a height near the ground. Further, the height of the seat unit at the driver's seat position (hip point: HP) can be suitably set.

Further, the position of the seat unit 10 when the hip point lowering operation has been completed can be set to the front-most (F/M) position or to a position between the rearmost R/M and the front-most F/M.

Further, although the lift-up unit 50 is used as a seat height adjusting device, in order to vary the height of the seat unit 10, it is possible to use a special seat height adjusting device that is separate from the lift-up unit 50.

When the seat unit 10 is taken up and down via a door opening portion other than that for the driver's seat, unlike in the case in which the seat unit is moved via the door opening portion for the driver's seat, no obstruction such as the steering wheel S is involved, so that the seat unit 10 can be very easily moved between the driver's seat position inside the vehicle cabin and the exterior of the vehicle cabin. Therefore, the door opening portion for taking up and down the seat unit 10 is not limited to the door opening portion D2 for the rear seat behind the driver's seat, and may be a door opening portion D5 for the assistant driver's seat, a door opening portion D3 for the rear seat behind the assistant driver's seat and a door opening portion D4 for a back door of the vehicle. Further, the short-slide unit that is used in the above described embodiment can be omitted, so that the seat unit can perform the short-sliding motion by means of the long-sliding unit 200.

Figure 10:
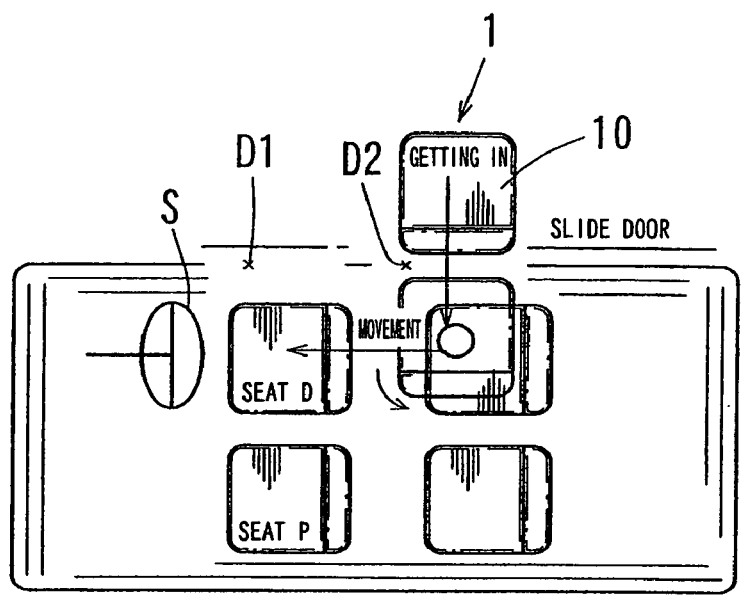
FIG. 10 shows a condition in which the seat unit is moved via a door opening portion D2 behind the driver's seat.

FIG. 10 is a diagram that schematically shows a moving route for the seat unit 10 of the first embodiment. FIG. 10 shows an embodiment in which the seat unit 10 is taken up and down via the door opening portion D2 for the rear seat in a second row behind the driver's seat (seat D).

Figure 11:
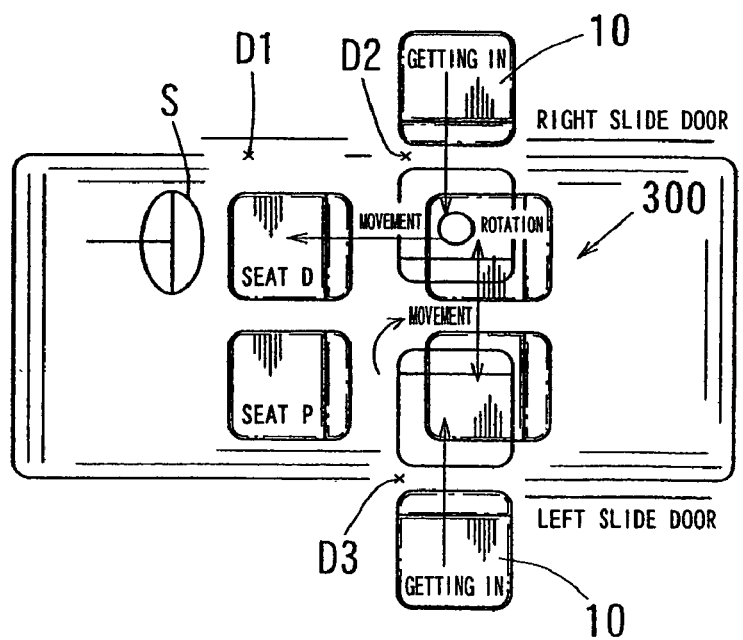
FIG. 11 is a second embodiment of the present invention, illustrating a condition in which a seat unit is moved via a door opening portion D2 behind a driver's seat or a door opening portion D3 behind an assistant driver's seat.
Figure 12:
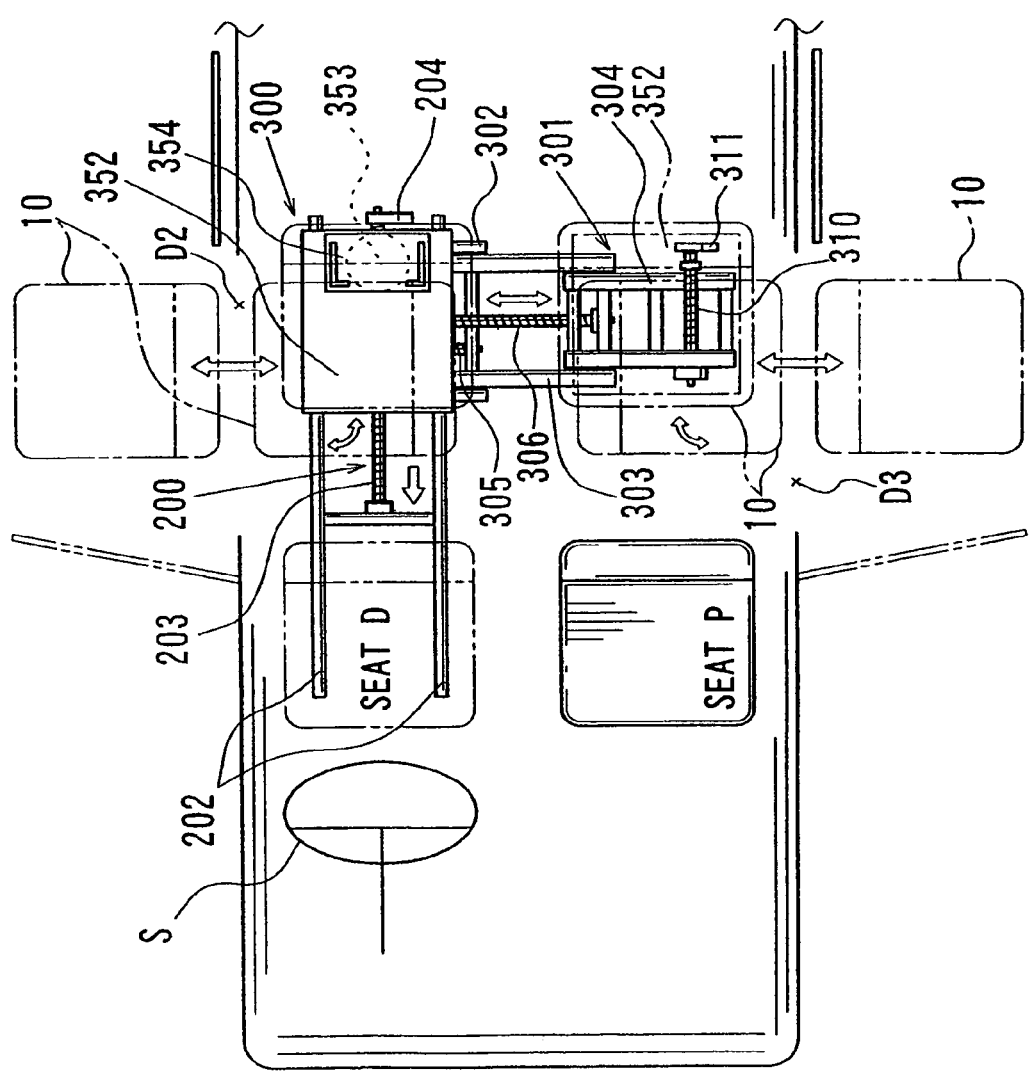
FIG. 12 is a plan view of the second embodiment.
Figure 13:
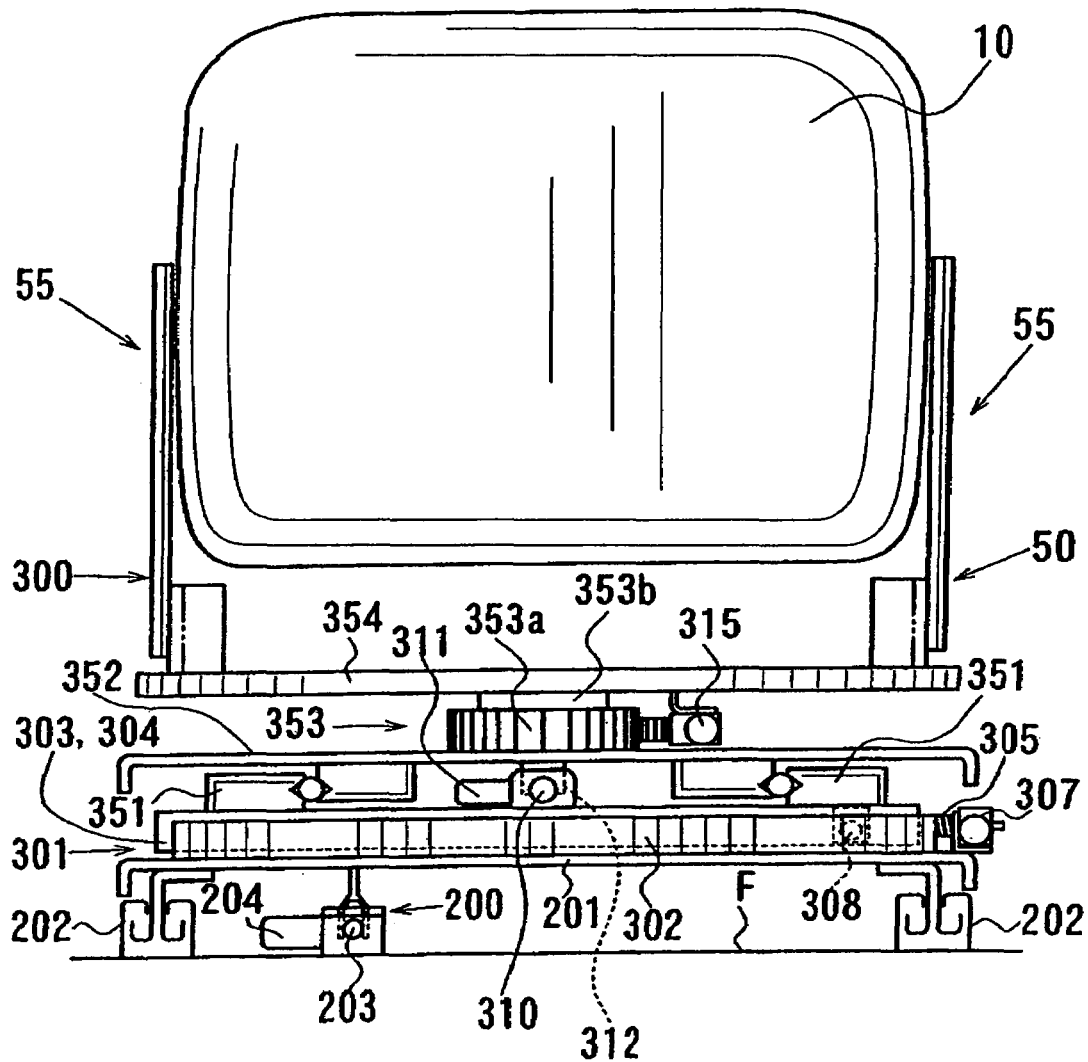
FIG. 13 is a rear view of the second embodiment.
Figure 14:
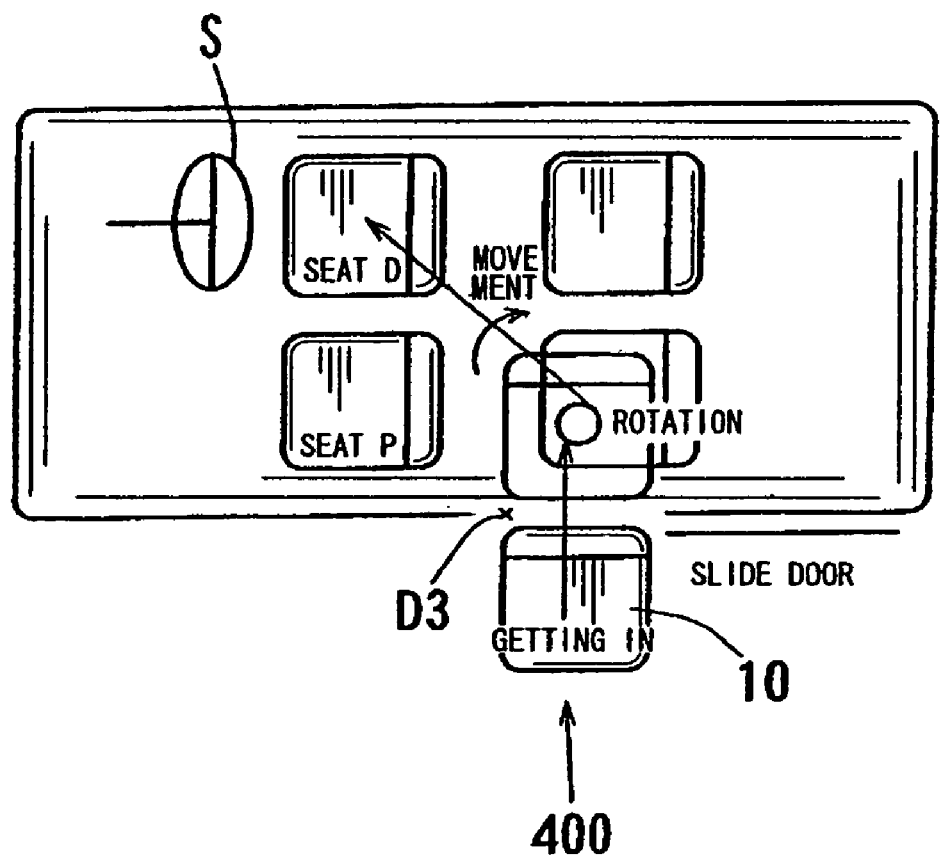
FIG. 14 is a third embodiment of the present invention, illustrating a condition in which a seat unit is moved via a door opening portion D3 behind an assistant driver's seat.
Figure 15:
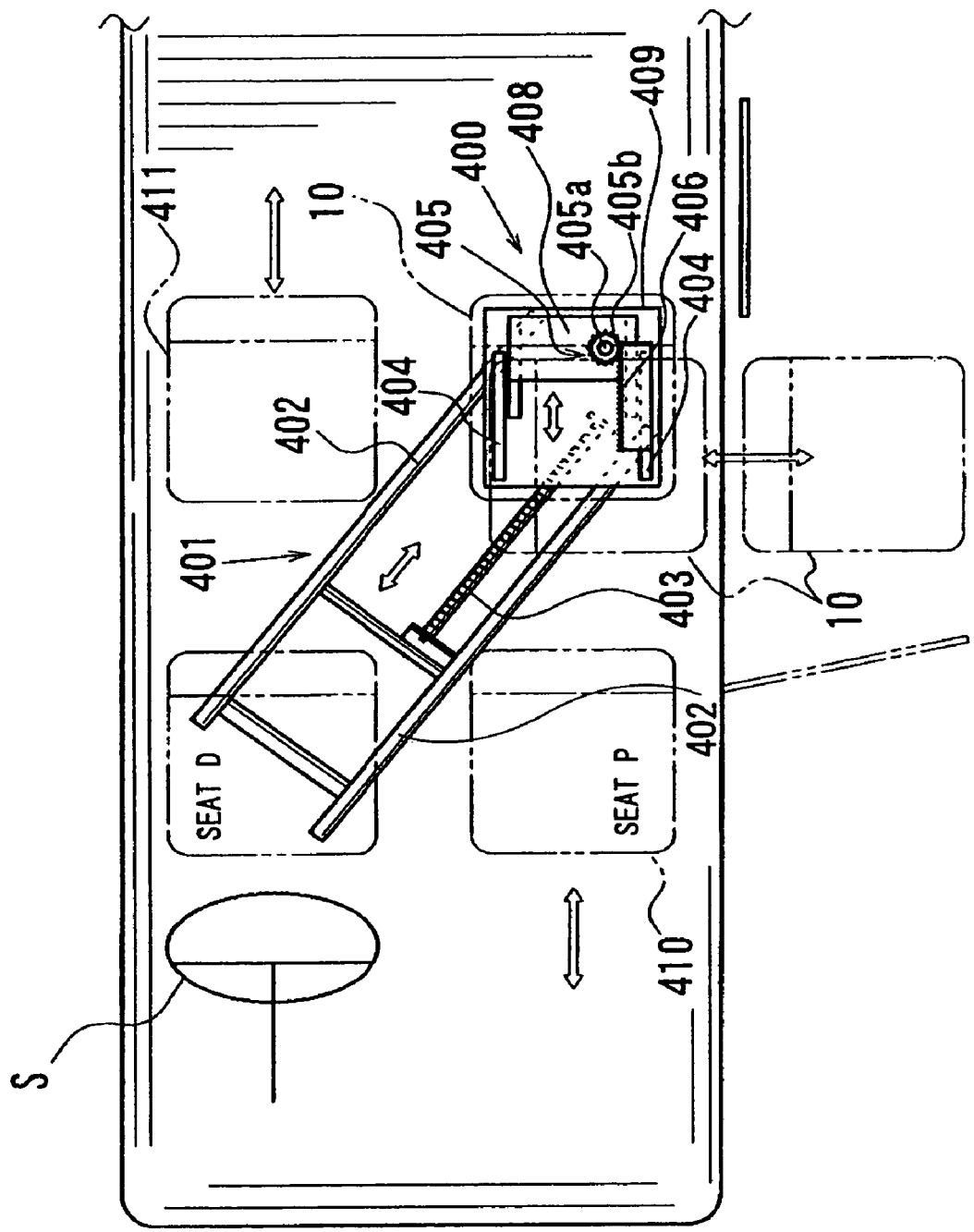
FIG. 15 is a plan view of the third embodiment.
Figure 16:
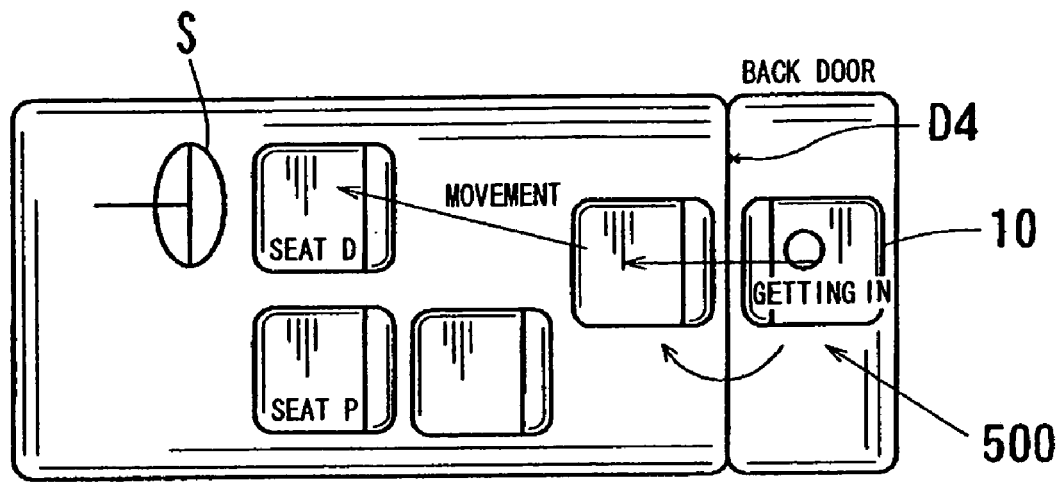
FIG. 16 is a fourth embodiment of the present invention, illustrating a condition in which a seat unit is moved via a back door opening portion D4.

FIGS. 11 to 18 exemplary show an embodiment in which the seat unit 10 is taken up and down via the door opening portions D3 to D5 other than the door opening portion D2 for the rear seat behind the driver's seat. FIGS. 11 through 13 show a vehicle seat 300 according to a second embodiment. FIGS. 14 and 15 show a vehicle seat 400 according to a third embodiment. FIG. 16 shows a vehicle seat 500 according to a fourth embodiment.

First, the vehicle seat 300 according to the second embodiment will be described. In the following description, the constructions and elements that are the same as those of the first embodiment (mainly the seat unit and the lift-up unit) are identified by the same reference numerals and description thereof will be omitted.

FIG. 11 shows an embodiment in which the door opening portion D3 behind the assistant driver's seat (seat P) or the door opening portion D2 behind the driver's seat (seat D) is arbitrarily selected and the seat unit 10 is taken up and down therethrough. As shown in FIGS. 12 and 13, in the second embodiment, in addition to the longitudinal long-sliding unit 200 for long-sliding the seat unit in the longitudinal direction of the vehicle as described in the first embodiment, a lateral long-sliding unit 301 for long-sliding the seat unit in a crosswise direction of the vehicle (the vertical direction in FIGS. 11 and 12). By combining the longitudinal long-sliding unit 200 with the lateral slide unit 301, the seat unit 10 can be moved between the exterior of the vehicle cabin and the driver's seat (seat D) position inside the vehicle cabin via the door opening portion D2 or the door opening portion D3.

The lateral slide unit 301 is attached to the main base 201 of the long-sliding unit 200 that is mounted on the vehicle floor F. The lateral slide unit 301 has a main slide frame 302, a first slide frame 303 that is laterally slidably supported on the main slide frame 302, and a second slide frame 304 that is laterally slidably supported on the first slide frame 303. Thus, the lateral slide unit 301 has a two-stage sliding structure. The main slide frame 302 is fixed to the main base 201.

As shown in FIG. 12, a first screw shaft 305 is rotatably attached between the main slide frame 302 and the first slide frame 303. Further, a second screw shaft 306 is rotatably attached between the first slide frame 303 and the second slide frame 304. The first screw shaft 305 is rotated by a first slide motor 307. When the first screw shaft 305 rotates, the first slide frame 303 slides in the crosswise direction of the vehicle with respect to the main slide frame 302. Further, the second screw shaft 306 is rotated by a second slide motor 308. When the second screw shaft 306 rotates, the second slide frame 304 slides in the crosswise direction of the vehicle with respect to the first slide frame 303. Pulse motors are used as the slide motors 307 and 308. Starting, stopping, rotating amount (rotating angle), rotating direction, rotating speed and so on of each of the pulse motors are controlled by a control unit.

Attached to the second slide frame 304 are short-slide rails 351, 351 that are positioned in parallel along the longitudinal direction of the vehicle. A sub base 352 is attached to the second slide frame 304 by means of the short-slide rails 351, 351, so as to be movable in the longitudinal direction of the vehicle. Further, a screw shaft 310 is rotatably attached to the second slide frame 304. This screw shaft 310 is rotated by a short-slide motor 311. Fixed to the lower surface of the sub base 352 by means of a bracket is a nut 312 that meshes with the screw shaft 310. Thus, when the screw shaft 310 is rotated by the short-slide motor 311, the sub base 352 slides forward or rearward in the longitudinal direction of the vehicle. A pulse motor is used as the short-slide motor 311. Starting, stopping, rotating amount (rotating angle), rotating direction, rotating speed and so on of the pulse motor are controlled by a control unit.

A swing base 354 is rotatably supported on the sub base 352 by means of a rotary device 353. The rotary device 353 has an outer wheel 353a and an inner wheel 353b which are rotatable relative to each other. The outer wheel 353a is attached to the upper surface of the sub base 352 and the inner wheel 353b is attached to the lower surface of the swing base 354. A pinion gear portion is formed in the outer peripheral surface of the outer wheel 353a. On the other hand, a driving motor 315 is attached to the lower surface of the swing base 354. A drive gear that is attached to the output shaft of the driving motor 315 meshes with the pinion gear portion of the outer wheel 353a. Thus, when the driving motor 315 rotates, the swing base 354 rotates. A pulse motor is used as the driving motor 315. Starting, stopping, rotating amount (rotating angle), rotating direction, rotating speed and so on of the pulse motor are controlled by a control unit.

The driving motor 315 and the short-slide motor 311 are controlled in synchronism with each other. As a result, the sliding motion of the seat unit 10 in the longitudinal direction of the vehicle and the rotating motion thereof simultaneously occur.

The seat unit 10 is connected to the swing base 354 by means of the right and left four-bar linkage mechanisms 55, 55. Because the swing base 354, the four-bar link mechanisms 55, 55 and the seat unit 10 has the same construction as those of the first embodiment, a detailed description thereof will be omitted. Further, in FIG. 13, the four-bar linkage mechanisms 55, 55 and the seat unit 10 are shown in a simplified form. Moreover, a driving device for driving the four-bar linkage mechanisms 55, 55 and the connecting portions 40 for connecting the seat unit 10 are not shown.

In the vehicle seat 300 according to the second embodiment thus constructed, the rotating motion of the seat unit 10 is performed by means of the driving motor 315 and the sliding motion of the seat unit 10 in the longitudinal direction of the vehicle is performed by means of the short-slide motor 311. Thus, by properly controlling the motors 311 and 315, it is possible to arbitrarily control the rotating motion and the sliding motion of the seat unit 10.

Therefore, in the seat unit 300 according to the second embodiment, by switching the control method for controlling the driving motor 315 and the short-slide motor 311, the seat unit 10 can be moved between the driver's seat position and the exterior of the vehicle cabin via the door opening portion D2 behind the driver's seat. Similarly, the seat unit 10 can be moved between the driver's seat position and the exterior of the vehicle cabin via the door opening portion D3 behind the assistant driver's seat.

For example, when the seat unit 10 is to be moved from the interior of the vehicle cabin to the exterior of the vehicle cabin via the door opening portion D2, the seat unit 10 is moved to the rear seat position behind the driver's seat (the right-hand side seat position in the second row), and then the seat unit 10 is slid toward the forward direction of the vehicle while rightwardly rotating. Thus, the seat unit 10 can be directed toward the side of the door opening portion D2. When the seat unit 10 is to be moved from the interior of the vehicle cabin to the exterior of the vehicle cabin via the door opening portion D3, the seat unit 10 is moved to the rear seat position behind the assistant driver's seat (the left-hand side seat position in the second row), and then the seat unit 10 is slid toward the forward direction of the vehicle while leftwardly rotating. Thus, the seat unit 10 can be directed to the side of the door opening portion D3. When the seat unit 10 is to be moved from the interior of the vehicle cabin to the exterior of the vehicle cabin via the door opening portion D2, in the position of the door opening portion D2 for the rear seat behind the driver's seat, the seat unit 10 is slid toward the rearward direction of the vehicle while leftwardly rotating. Thus, the seat unit 10 can be directed to the forward direction of the vehicle. When the seat unit 10 is to be moved from the exterior of the vehicle cabin to the interior of the vehicle cabin via the door opening portion D3, in the position of the door opening portion D3 for the rear seat behind the assistant driver's seat, the seat unit 10 is slid toward the rearward direction of the vehicle while rightwardly rotating. Thus, the seat unit 10 can be directed to the forward direction of the vehicle.

As described above, when the seat unit 10 is to be moved between the driver's seat position inside the vehicle cabin and the exterior of the vehicle cabin via the door opening portion D2 corresponding to the side of the driver's seat, an operation that is completely the same as that in the first embodiment is performed. In this case, there is no need to operate the lateral long-sliding unit 301.

To the contrary, when the seat unit 10 is to be moved between the driver's seat position inside the vehicle cabin and the exterior of the vehicle cabin via the door opening portion D3 corresponding to the side of the assistant driver's seat, it is necessary to move the seat unit 10 in the crosswise direction of the vehicle (between the right-hand side seat position and the left-hand side seat position in the second row) by means of the lateral long-sliding unit 301. That is, when the seat unit 10 is to be moved from the exterior of the vehicle cabin to the driver's seat position via the door opening portion D3, the four-bar linkage mechanisms 55, 55 of the lift-up unit 50 are pivotally rotated in the erecting direction, with the seat unit 10 being connected to the lift-up unit 50. Thereafter, as described above, the driving motor 315 and the short-slide motor 311 are rotated, thereby moving the seat unit 10 toward the rearward direction of the vehicle while rotating. As a result, the seat unit 10 is directed toward the forward direction of the vehicle. At this stage, the seat unit 10 is positioned at the left-hand side seat position in the second row.

After the seat unit 10 is directed toward the forward direction of the vehicle at the left-hand side seat position in the second row, the first slide motor 307 and the second slide motor 308 are rotated, thereby moving the seat unit 10 to the right-hand side seat position in the second row. That is, the first slide motor 307 is rotated, so that the first slide frame 303 is retreated (upwards in FIG. 12), and the second slide motor 308 is rotated, so that the second slide frame 304 is retreated (upwards in FIG. 12) with respect to the first slide frame 303. Thus, the seat unit 10 can be quickly moved from the left-hand side seat position in the second row (the side of the door opening portion D3) to the right-hand side seat position (the side of the door opening portion D2) while directing the forward direction of the vehicle.

After the seat unit 10 is moved from the left-hand side seat position to the right-hand side seat position in the second row, the seat unit is moved to the driver's seat position by means of a long-slide motion similar to that in the first embodiment.

In this way, by using the seat unit 300 according to the second embodiment, like the first embodiment, the seat unit 10 can be smoothly moved between the driver's seat position inside the vehicle cabin and the exterior of the vehicle cabin. Thus, when an elderly person, a physically handicapped person or the like drives the vehicle, he can easily get in and out of the vehicle. Further, because the seat unit 10 can be moved between the driver's seat position and the exterior of the vehicle cabin via the door opening portion D2 or the door opening portion D3 that are provided on the right-hand or left-hand side of the vehicle, the usability of the vehicle seat 300 is further improved.

In the above description, although the lateral motion of the seat unit 10 in the vehicle crosswise direction and the rotating motion of the seat unit are successively carried out, these motions may also be simultaneously carried out. For example, after the four-bar linkage mechanisms 55, 55 have been pivotally rotated in the erecting direction, the first and second slide motors 307 and 308 are driven, thereby moving the seat unit 10 to the side of the door opening portion D2. Further, at the same time, the seat unit 10 may be slid in the rearward direction of the vehicle by rotating the short-slide motor 311 while rotating the seat unit 10 by rotating the driving motor 315. By simultaneously rotating the driving motor 315, the short-slide motor 311 and the first and second slide motors 307 and 308, the seat unit 10 can be quickly moved between the left-hand side seat position and the right-hand side seat position in the second row.

Further, in the second embodiment, although the lateral slide unit 301 of a two-stage sliding structure is used, it is also possible to use a single-stage sliding structure or a sliding structure of three or more stages depending on the required slide distance.

Further, although the door opening portions D2 and D3 having sliding doors are exemplified, the vehicle seat of the present invention is also applicable to a door opening portion having a door (rotating door) that is horizontally rotatably hinged.

Further, in the second embodiment, although the first and second slide frames 303 and 304 are slid by meshing engagement of the screw shaft 305 (306) and the nut of the lateral sliding unit 301, a rack and pinion mechanism, a belt or the like can be used in order to slide one or more slide frames.

In the second embodiment described above, the seat unit 10 is moved via the door opening portion selected from the door opening portions D2 and D3 on the vehicle sides, a further modification can be made. A vehicle seat 400 according to a third embodiment is shown in FIGS. 14 and 15.

In the vehicle seat 400 according to the third embodiment, the seat unit 10 is moved from the exterior of the vehicle cabin to the interior of the vehicle cabin via the door opening portion D3 on the left-hand side of the vehicle, and then the seat unit is forwardly obliquely slid, so as to be directly long-slid to the driver's seat position. Thus, the vehicle seat 400 according to the third embodiment does not have with the longitudinal long-sliding unit 200 and the lateral slide unit 301 that are used in the second embodiment. The third embodiment employs an oblique long-sliding unit 401 for obliquely moving the seat unit 10 from the left-hand side seat position in the second row behind the assistant driver's seat to the driver's seat position. Both of the oblique long-sliding unit 401 and the long-sliding unit 200 respectively have a similar construction in that they include a pair of long-slide rails (402, 202) parallel to each other and include a driving mechanism consisting of a long-slide motor, a screw shaft and so on.

In FIG. 15, reference numeral 403 indicates a long-slide screw shaft. A main base 409 is slidable along the long-slide rails 402, 402 of the long-sliding unit 401. Provided to the upper surface of the main base 409 is a slide base 408 that is slidable along short-slide rails 404, 404 in the longitudinal direction of the vehicle. Four-bar linkage mechanisms are provided to both sides of a swing base 408. The four-bar linkage mechanisms, the seat unit 10 and so on are of the same construction as those of the first and second embodiments.

In the third embodiment, a rack and pinion mechanism is used as a synchronizing mechanism for synchronizing the rotating motion of the seat unit 10 and the sliding motion thereof in the longitudinal direction of the vehicle. In FIG. 15, a rotary mechanism 405 has an inner wheel 405a and an outer wheel 405b. In this embodiment, the inner wheel 405a is attached to the main base 409 and the outer wheel 405b is attached to the lower surface of the swing base 408. A pinion gear portion is formed on the peripheral surface of the outer wheel 405b. This pinion gear portion meshes with a rack 406 that is attached to the short-slide rail 404 fixed to the main base 409. Due to this rack and pinion mechanism, the seat unit 10 may slide in the longitudinal direction of the vehicle while rotating between the position where it is directed toward the forward direction of the vehicle and the position where it is directed to the door opening portion D3.

Because the movement between the left-hand side seat position of the second row behind the assistant driver's seat and the exterior of the vehicle cabin is the same as that in the first and second embodiments, a description thereof will be omitted.

In this embodiment, positioned on an assistant driver's seat 410 and the right-hand side seat 411 in the second row behind the driver's seat are power seats of which the seat positions can be adjusted by driving motors. The seat position of the power seat in the longitudinal direction of the vehicle can be adjusted by a driving motor. The seat positions of the seats 410 and 411 can be arbitrarily set through a normal operation of the seated person. Further, when the seat unit 10 starts long-slide motion, the assistant driver's seat 410 and the right-hand side seat 411 in the second row are automatically controllably moved forwards and rearwards, respectively. Thus, the seat unit 10 can pass through between the seats 410 and 411 without interfering with the assistant seat 410 and the right-hand side seat 411 of the second row.

When the seat unit 10 reaches the driver's seat position or the left-hand side seat position of the second row in the door opening portion D3, the assistant driver's seat 410 and the right-hand side seat 411 of the second row are respectively returned to the former seat positions. Further, in the state in which the seat unit 10 does not move, the positions of the seats 410 and 411 can be set to arbitrarily positions.

Also, in the vehicle seat 400 according to the third embodiment, because the seat unit 10 can be smoothly moved between the driver's seat position inside the vehicle cabin and the exterior of the vehicle cabin, an elderly person, a physically handicapped person or the like can easily get in out of the vehicle when they drives the vehicle.

FIG. 16 shows a vehicle seat 500 according to a fourth embodiment. In the fourth embodiment, the seat unit 10 is taken up and down via a back door opening portion D4 and not via the door opening portions at the sides of the vehicle. The fourth embodiment uses a long-sliding unit (not shown) that forwardly obliquely extends from the central portion of the back door opening portion D4 to the driver's seat position. Further, a rotary device which can rotate the seat unit 10 by approximately 180 degrees is used.

In the vehicle seat 500 according to the fourth embodiment, the seat 10 is turned backward and is brought near the back door opening portion D4. Next, the seat unit 10 is connected to the lift-up unit (not shown). Thereafter, the lift-up unit is operated in the erecting direction, thereby accommodating the seat unit 10 in the vehicle cabin. Subsequently, the seat unit 10 is reversed by means of the rotary device such that the seat unit 10 faces the front side of the vehicle. Thereafter, the seat unit 10 is moved to the driver's seat position by means of the long-sliding unit. In this embodiment, the short-slide mechanism may be omitted.

Figure 17:
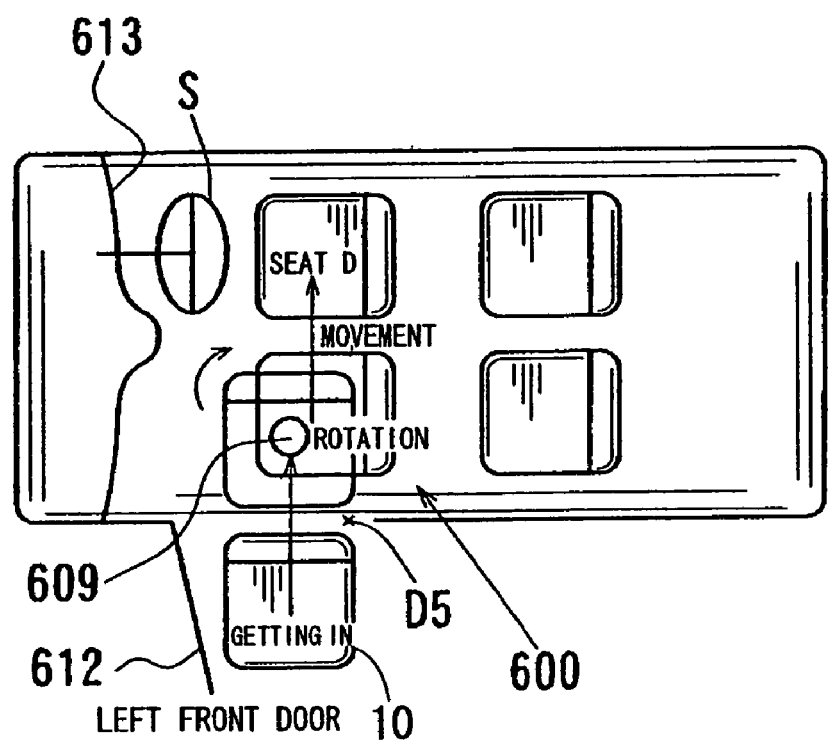
FIG. 17 is a fifth embodiment of the present invention, illustrating a condition in which a seat unit is moved via a door opening portion D5 of an assistant driver's seat.
Figure 18:
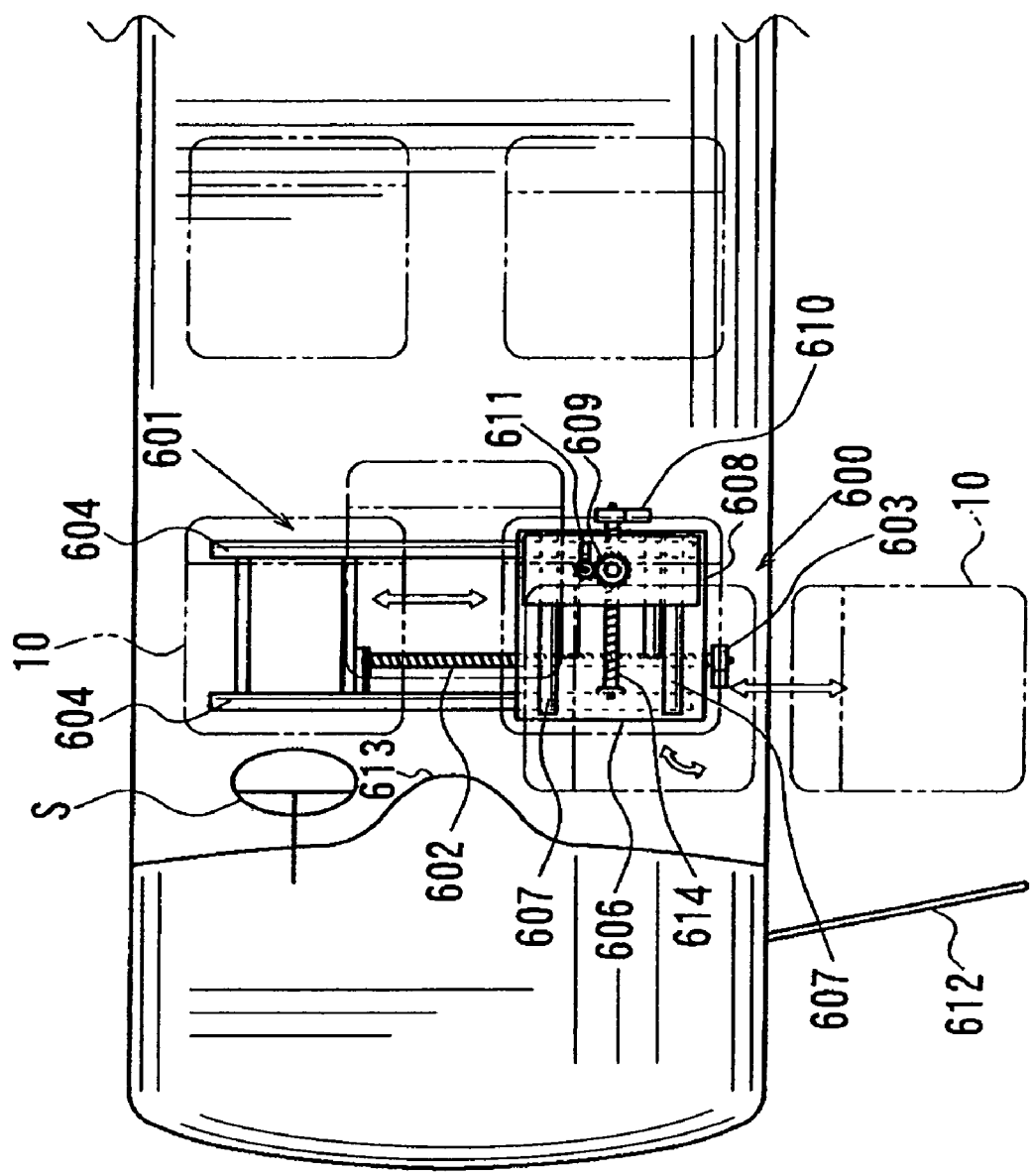
FIG. 18 is a plan view of the fifth embodiment.

FIGS. 17 and 18 show a vehicle seat 600 according to a fifth embodiment. In the fifth embodiment, the seat unit 10 is taken up and down via a door opening portion D5 for the assistant driver's seat. In the fifth embodiment, the door opening portion D5 is opened and closed by means of a rotating door 612 that is rotatably supported by a hinge at its front portion. The movement between the assistant driver's seat position and the driver's seat position is performed by means of a long-sliding unit 601.

The long-sliding unit 601 is mounted on the vehicle floor F, so as to extend along the crosswise direction of the vehicle. Similar to the first to fifth embodiments, the long-sliding unit 601 may slide a sliding side frame member with respect to long-slide rails 604, 604 by meshing engagement of a screw shaft 602 and a nut. The screw shaft 602 is rotated by a long-slide motor 603. A main base 606 is attached to the sliding side frame member.

A sub base 608 is provided on the main base 606 via short-slide rails 607, 607, so as to be movable in the longitudinal direction of the vehicle. The sub base 608 is rotated by rotating a screw shaft 614 by means of a short-slide motor 610. A swing base is attached to the upper surface of the sub base 608 via a rotating plate 609. A lift-up unit including the swing base, four-bar linkage mechanisms and so on is formed in the same manner as the above-described embodiments. Thus, in FIG. 18, the lift-up unit is not shown.

Further, similar to the above-described embodiments, the rotating plate 609 is equipped with an outer ring that has a gear portion formed in its peripheral surface and an inner ring that is rotatable relative to the outer ring. The outer ring is attached to the upper surface of the sub base 608, and the inner ring is attached to the lower surface of the swing base. The gear portion of the outer ring meshes with a pinion gear formed in an output shaft of a driving motor 611 that is attached to the lower surface of the swing base. Thus, when the driving motor 611 rotates, the swing base and, consequently, the seat unit 10 rotate between the position where it faces the front side of the vehicle and the position where it faces the door opening portion D5. The rotating angle of the seat unit 10 can be arbitrarily set by controlling the driving motor 611.

In the seat unit 600 according to the fifth embodiment, the seat unit 10 is turned backward and is brought near the door opening portion D5. The seat unit 10 is then connected to the lift-up unit. Thereafter, the four-bar linkage mechanisms of the lift-up unit is operated in the erecting direction, thereby positioning the seat unit 10 on the swing base. Thus, the seat unit 10 is accommodated in the vehicle cabin.

Thereafter, by rotating the short-slide motor 610 and the driving motor 609, the seat unit 10 is slid toward the rear side of the vehicle while rotating to the position where it faces the front side of the vehicle. As a result, the seat unit 10 is rotated to the position where it faces the front side of the vehicle without interfering with a pillar or other such members. The rotating motion of the seat unit 10 and the sliding motion thereof in the longitudinal direction of the vehicle are synchronously performed by properly controlling the short-slide motor 610 and the driving motor 609.

Subsequently, the screw shaft 602 is rotated by rotating the long-slide motor 603, so that seat unit 10 is laterally slid from the assistant driver's seat position to the driver's seat position.

In the lateral sliding process, it is possible to short-slide the seat unit 10 while rotating. For example, as shown in FIG. 18, when the central portion of an instrument panel 613 of the vehicle is swollen toward a movement path of the seat unit 10, if the seat unit 10 is slid along a linear movement path, the seat unit 10 or the seating person may contact the instrument panel 613. In such a case, the driving motor 609 and/or the short-slide motor 610 are rotated, so that the seat unit 10 is rotated and/or is short-slid in the longitudinal direction of the vehicle. Thus, the seat unit 10 can be laterally slid while the seat unit 10 and so on are prevented from contacting the instrument panel 613. The rotating motion and the short-sliding motion of the seat unit 10 during this lateral sliding process may also be synchronized with the long-sliding motion by properly controlling the driving motor 611 and the short-slide motor 610.

Like the vehicle seats according to the above-described embodiments, in the vehicle seat 600 according to the fifth embodiment, it is possible to smoothly move the seat unit 10 between the driver's seat position in the vehicle cabin and the exterior of the vehicle cabin. Therefore, even when an elderly person, a physically handicapped person or the like drives the vehicle, the driver can easily get in and out of the vehicle.

In the above-described embodiments, although the seat unit 10 is constructed, so as to be connected to and separated from the lift-up unit 50, the seat unit 10 can be constructed, so as not to be separated from the lift-up unit. Such a construction may have the same effects as those of the first to fifth embodiments, except that the seat unit cannot be independently uses as a wheelchair outside the vehicle cabin.

Further, in the above-described embodiments, although the series of operations described above are performed by means of the control unit while the interior operating switch and the exterior operating switch outside the vehicle are being manipulated, it is also possible to provide operating switches for the respective operations, so that the operations can be performed by the control unit only when the corresponding operating switches are manipulated.

We claim:

1. A vehicle seat assembly, comprising;
    a seat;
    a seat rotating device for rotating the seat between a front facing passenger scat position and a position where the seat faces a door opening portion adjacent to the passenger seat position;
    a long-sliding unit for sliding the seat and the seat rotating device between a driver's seat position and the passenger seat position;
    a seat moving device for raising or lowering the seat while moving the seat in its longitudinal direction; and
    a rotation and sliding synchronizing device for sliding the seat at the passenger seat position in a longitudinal direction of the vehicle in synchrony with of the seat imparted by the seat rotating device,
    wherein the seat moving device is arranged and constructed to function when the seat slides between the driver's seat position and the passenger seat position as well as when the seat moves between the passenger seat position and the exterior of the vehicle via the door opening portion.

2. A vehicle seat assembly according to claim 1, wherein when the seat is rotated toward the forward direction of the vehicle, the rotation and sliding synchronizing device slides the seat toward the rearward direction of the vehicle in synchrony with the rotating motion.

3. A vehicle seat assembly according to claim 1, wherein the long-sliding unit comprises a longitudinal long-sliding unit for sliding the seat and the seat rotating device in the longitudinal direction of the vehicle.

4. A vehicle seat according to claim 1, wherein the long-sliding unit comprises a lateral long-sliding unit that can slide the seat and the seat rotating device in a crosswise direction of the vehicle.

5. A vehicle seat according to claim 1, wherein the long-siding unit comprises a longitudinal long-sliding unit that can slide the seat and the seat rotating device in a longitudinal direction of the vehicle and a lateral long-sliding unit that can slide the seat and the scat rotating device in a crosswise direction of the vehicle.

6. A vehicle seat assembly according to claim 3, wherein the longitudinal long-sliding unit is inclined from the rear side of the vehicle to the front side of the vehicle.

7. A vehicle seat according to claim 5, wherein the longitudinal long-sliding unit is inclined from the rear side of the vehicle to the front side of the vehicle.

8. A vehicle seat according to claim 1, wherein the long-sliding unit has an oblique long-sliding unit that can slide the seat and the seat rotating device between the driver's seat position and a passenger seat position diagonally behind the driver's seat position.

9. A vehicle seat according to claim 8, further comprising a retracting device that can retract a rear seat positioned behind the driver's seat position and an assistant driver's seat positioned beside the driver's seat position to a position where they do not interfere with the seat when the seat is slid by means of the oblique long-sliding unit.

10. A vehicle seat assembly according to claim 1, further comprising a short-slide device for sliding the seat in the longitudinal direction of the vehicle, wherein the rotation and sliding synchronizing device synchronizes the rotating motion of the seat by the seat rotating device and the sliding motion of the seat by the short-slide device.

11. A vehicle seat assembly according to claim 1, wherein the seat rotating device has a driving device for rotating the seat, wherein the short-slide device has a driving device for sliding the seat in the longitudinal direction of the vehicle, and wherein the rotation and sliding synchronizing device synchronously controls the driving device of the short-slide device and the driving device of the seat rotating device.

12. A vehicle seat assembly according to claim 1, wherein the long-sliding unit has a driving device for sliding the seat, wherein the seat rotating device has a driving device for rotating the seat, and wherein the rotation and sliding synchronizing device synchronously controls the driving device of the long-sliding unit and the driving device of the seat rotating device.

13. A vehicle seat assembly according to claim 1, wherein the rotation and sliding synchronizing device synchronizes the rotation motion of the seat and the sliding motion of the seat only within a predetermined angle range measured from a position in which the seat faces the door opening position toward a position in which the seat faces the front of the vehicle.

14. A vehicle seat assembly according to claim 1, wherein the seat moving device functions as a seat position adjusting device for adjusting a height of the seat at the driver's seat position.

15. A vehicle seat assembly according to claim 1, wherein the long-sliding unit comprises a longitudinal long-sliding unit for sliding the seat and the seat rotating device in a longitudinal direction of the vehicle.

16. A vehicle seat according to claim 3, wherein the long-sliding unit comprises a lateral long-sliding unit that can slide the seat and the seat rotating device in a crosswise direction of the vehicle.

17. A vehicle seat according to claim 3, wherein the long-sliding unit comprises a longitudinal long-sliding unit that can slide the seat and the seat rotating device in a longitudinal direction of the vehicle and a lateral long-sliding unit that can slide the seat and the seat rotating device in a crosswise direction of the vehicle.

18. A vehicle seat according to claim 13, wherein the long-sliding unit has an oblique long-sliding unit that can slide the seat and the seat rotating device between the driver's seat position and a passenger seat position diagonally behind the driver's seat position.

19. A vehicle seat according to claim 18, further comprising a retracting device that can retract a rear seat positioned behind the driver's seat position and an assistant driver's seat positioned beside the driver's seat position to a position where they do not interfere with the seat when the seat is slid by means of the oblique long-sliding unit.

20. A vehicle seat assembly according to claim 1, wherein the seat moving device has a four-bar linkage mechanism.

21. A vehicle seat assembly according to claim 1, further comprising a connecting device separately connecting the scat and the seat moving device.

22. A vehicle seat assembly according to claim 21, wherein the seat is provided with foldable wheels.

23. A vehicle seat assembly comprising:
a seat;
a seat rotating device for rotating the seat between a position where the seat faces the front side of a vehicle and a position where the seat faces a door opening portion;
a long-sliding unit for sliding the seat and the seat rotating device between a driver's seat position and a passenger seat position adjacent to the door opening portion; and
a seat moving device for raising or lowering the seat while moving the seat in its longitudinal direction
wherein when the person is to get out of the vehicle, the seat slides from the driver's seat position to the passenger seat position by the long-sliding unit and is raised while moving toward the rear of the vehicle by the seat moving device, and is then lowered to a position near the ground surface while moving to the exterior of the vehicle via the door opening portion by the seat moving device after the seat is rotated from a position where the seat faces the front side of the vehicle to a position where the seat faces the door opening portion by the rotating device, and
wherein when the person is to get in the vehicle, the seat is moved to the passenger seat position via the door opening portion while raising from the position near the ground surface in the exterior of the vehicle by the seat moving device, and is then lowered to a position near a vehicle floor while moving toward the front side of the vehicle by the seat moving device and is slid from the passenger seat position to the driver's seat position by the long-sliding unit after the seat is rotated to the position where the seat faces the front side of the vehicle by means of the rotating device.

* * * * *